(12) United States Patent
Goto

(10) Patent No.: US 10,759,119 B2
(45) Date of Patent: *Sep. 1, 2020

(54) THREE DIMENSIONAL MOLD OBJECT MANUFACTURING APPARATUS, METHOD FOR MANUFACTURING THREE DIMENSIONAL MOLD OBJECT, AND THREE DIMENSIONAL MOLD OBJECT

(71) Applicant: SEIKO EPSON CORPORATION, Tokyo (JP)

(72) Inventor: Junichi Goto, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 99 days.

This patent is subject to a terminal disclaimer.

(21) Appl. No.: 16/169,007

(22) Filed: Oct. 24, 2018

(65) Prior Publication Data

US 2019/0054704 A1 Feb. 21, 2019

Related U.S. Application Data

(63) Continuation of application No. 14/557,638, filed on Dec. 2, 2014, now Pat. No. 10,137,637.

(30) Foreign Application Priority Data

Dec. 10, 2013 (JP) .................................. 2013-254768

(51) Int. Cl.
*B29C 64/393* (2017.01)
*B29C 64/194* (2017.01)
(Continued)

(52) U.S. Cl.
CPC ............ *B29C 64/393* (2017.08); *B29C 64/10* (2017.08); *B29C 64/165* (2017.08);
(Continued)

(58) Field of Classification Search
CPC ............ B26C 67/0051; B26C 67/0055; B26C 67/0059; B26C 67/0085; B33Y 30/00;
(Continued)

(56) References Cited

U.S. PATENT DOCUMENTS 4,907,013 A * 3/1990 Hubbard .................... B41J 2/07
250/222.1
5,096,530 A * 3/1992 Cohen ................... B29C 64/141
156/229

(Continued)

FOREIGN PATENT DOCUMENTS

| JP | 2004-277881 A | 10/2004 |
| JP | 2005-097692 A | 4/2005 |
| JP | 2005-335203 A | 12/2005 |

*Primary Examiner* — Robert C Dye
*Assistant Examiner* — Taryn Trace Willett
(74) *Attorney, Agent, or Firm* — Global IP Counselors, LLP

(57) ABSTRACT

A three dimensional mold object manufacturing apparatus manufactures a three dimensional mold object by repeatedly layering layers using a composition including particles. The apparatus includes a layer forming section configured to form the layers using the composition, a binding liquid applying unit configured to apply binding liquid for bonding the particles, an infrared ray irradiating unit configured to cure the binding liquid, and a bulge detecting unit configured to detect a bulge on the layers. The layer forming section and the infrared ray irradiating unit are configured to move in the same direction. When the bulge detecting unit detects the bulge with a height equal to or more than a predetermined height formed on one of the layers, the layer forming section is configured to adjust a thickness of a subsequent one of the layers, which is provided directly on the one of the layers where the bulge is detected.

10 Claims, 9 Drawing Sheets

(51) Int. Cl.
  *B29C 64/10* (2017.01)
  *B29C 64/30* (2017.01)
  *B29C 64/188* (2017.01)
  *B29C 64/165* (2017.01)
  *B29K 105/00* (2006.01)

(52) U.S. Cl.
  CPC .......... *B29C 64/188* (2017.08); *B29C 64/194* (2017.08); *B29C 64/30* (2017.08); *B29K 2105/251* (2013.01)

(58) Field of Classification Search
  CPC ......... B33Y 10/00; B33Y 40/00; B33Y 99/00; B29C 67/0085; B29C 67/0096; B29C 67/0055; B29C 67/0051; B29C 67/0059; B29C 67/0062; B29C 67/0066; B29C 67/007; B29C 67/0074; B29C 67/0077; B29C 67/0081; B29C 67/0088; B29C 67/0092
  See application file for complete search history.

(56) References Cited

U.S. PATENT DOCUMENTS

| | | | | |
|---|---|---|---|---|
| 5,688,464 A * | 11/1997 | Jacobs | .................... | B29C 41/12 264/401 |
| 5,902,537 A * | 5/1999 | Almquist | ............... | B33Y 30/00 264/401 |
| 5,922,364 A * | 7/1999 | Young, Jr. | ............... | B29C 64/20 425/174.4 |
| 6,147,760 A * | 11/2000 | Geng | ................. | G01B 11/2509 356/3.01 |
| 6,169,605 B1 * | 1/2001 | Penn | ...................... | H05K 3/125 358/1.1 |
| 6,656,410 B2 * | 12/2003 | Hull | ........................ | B29C 41/12 264/401 |
| 6,782,303 B1 * | 8/2004 | Fong | .................. | G05B 19/4099 700/119 |
| 7,847,212 B2 * | 12/2010 | Renz | ...................... | B22F 3/003 219/121.61 |
| 8,576,412 B2 * | 11/2013 | Nakanishi | .......... | G01D 5/34715 356/621 |
| 8,747,097 B2 * | 6/2014 | Pettis | .................... | G06F 3/1229 425/375 |
| 8,784,723 B2 * | 7/2014 | Napadensky | ........ | B29C 64/112 264/497 |
| 8,956,692 B2 * | 2/2015 | Fruth | .................. | B29C 67/0077 427/180 |
| 9,505,057 B2 * | 11/2016 | Nordkvist | ............. | B29C 64/153 |
| 9,802,360 B2 * | 10/2017 | LaBossiere | ............. | B29C 64/00 |
| 2002/0093115 A1 * | 7/2002 | Jang | ...................... | B29C 64/165 264/113 |
| 2002/0104973 A1 * | 8/2002 | Kerekes | ................ | B22F 3/1055 250/559.2 |
| 2005/0049739 A1 * | 3/2005 | Kramer | .................. | B33Y 10/00 700/119 |
| 2006/0208396 A1 | 9/2006 | Abe et al. | | |
| 2015/0139849 A1 * | 5/2015 | Pialot, Jr. | .............. | B22F 3/1055 419/55 |
| 2015/0174658 A1 * | 6/2015 | Ljungblad | ............ | B29C 64/386 419/55 |
| 2016/0159006 A1 * | 6/2016 | Wang | ..................... | B33Y 30/00 425/166 |
| 2017/0259396 A1 * | 9/2017 | Yamamura | ............. | B33Y 10/00 |

* cited by examiner

Fig. 1A
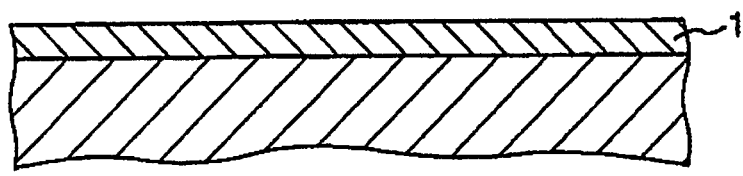
Fig. 1B
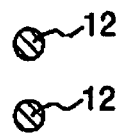
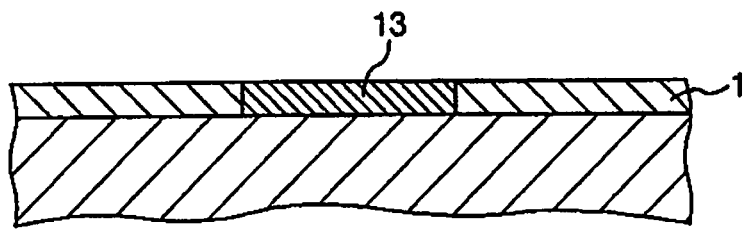
Fig. 1C
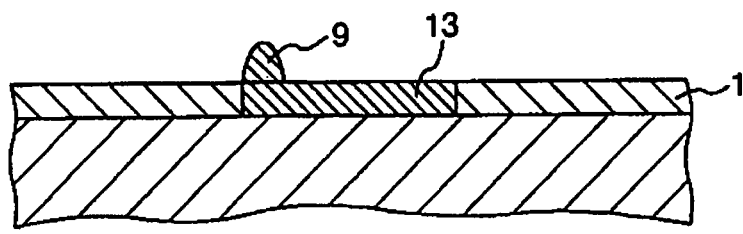
Fig. 1D
Fig. 1E
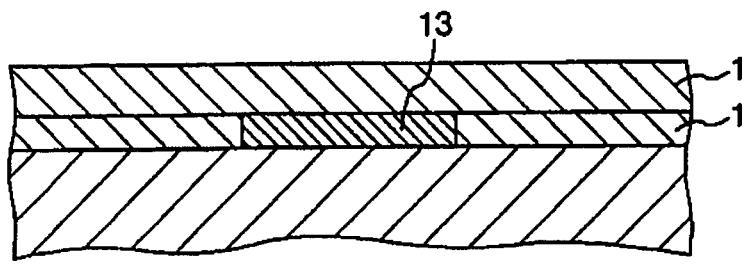

THREE DIMENSIONAL MOLD OBJECT MANUFACTURING APPARATUS, METHOD FOR MANUFACTURING THREE DIMENSIONAL MOLD OBJECT, AND THREE DIMENSIONAL MOLD OBJECT

CROSS-REFERENCE TO RELATED APPLICATIONS

This is a continuation application of U.S. patent application Ser. No. 14/557,638, which claims priority to Japanese Patent Application No. 2013-254768 filed on Dec. 10, 2014. The entire disclosures of U.S. patent application Ser. No. 14/557,638 and Japanese Patent Application No. 2013-254768 are hereby incorporated herein by reference.

BACKGROUND

Technical Field

The present invention relates to a three dimensional mold object manufacturing apparatus, a method for manufacturing a three dimensional mold object, and a three dimensional mold object.

Related Art

A technique is known where a three dimensional mold object is molded by forming a powder layer (a unit layer) using particles and the powder layers are layered. With this technique, the three dimensional mold object is molded by the following operations being repeated. First, a powder layer is formed by thinly laying powder with a uniform thickness and the powder is selectively bonded only at desired portions of the powder layer. As a result, a member with a thin plate shape (referred to below as a "cross sectional member") is formed at a portion where the powder is bonded to itself. After this, on this powder layer, another powder layer is thinly formed and the powder is selectively bonded only at desired portions. As a result, a new cross sectional member is formed with the powder layer which is newly formed. At this time, the cross sectional member which is newly formed is also bonded with the cross sectional member which was previously formed. By repeating these operations, it is possible to form a three dimensional mold object by layering the cross sectional members with the thin plate shape one layer at a time.

There are problems with this technique such as that, since the powder layer with a smaller thickness (for example, a powder layer with a thickness of several hundred μm or less) is formed using the powder, dimensional precision of the three dimensional mold object which is obtained is reduced and significant defects are generated such as missing portions or the like in the three dimensional mold object which is obtained in a case where there are bulges due to foreign matter or the like on the powder layer even when the size of the three dimensional mold object is relatively small.

In order to solve this problem, a method is proposed where bulges are removed using a processing means (a removing means) which is provided with a milling head (for example, refer to Japanese Unexamined Patent Application Publication No. 2004-277881). However, productivity of the three dimensional mold object is reduced due to this method. In particular, in a case where there are numerous bulges, productivity of the three dimensional mold object is remarkably reduced since it is necessary for the bulges to be removed individually. In addition, it is necessary to carry out planarizing again since removing of the bulges is accompanied with disturbing of the layer and this is a further cause of productivity of the three dimensional mold object being reduced.

SUMMARY

The object of the present invention is to provide a three dimensional mold object manufacturing apparatus where it is possible to effectively manufacture a three dimensional mold object with superior dimensional precision where defects are effectively prevented from being generated, to provide a method for manufacturing a three dimensional mold object where it is possible to effectively manufacture a three dimensional mold object with superior dimensional precision where defects are effectively prevented from being generated, and to provide a three dimensional mold object which is manufactured using the three dimensional mold object manufacturing apparatus or the method for manufacturing a three dimensional mold object.

This object is achieved using the aspects described below.

A three dimensional mold object manufacturing apparatus is adapted to manufacture a three dimensional mold object by repeatedly forming and layering layers using a composition including particles. The three dimensional mold object manufacturing apparatus includes a layer forming section, a binding liquid applying unit, an infrared ray irradiating unit, and a bulge detecting unit. The layer forming section is configured and arranged to form the layers using the composition. The binding liquid applying unit is configured and arranged to apply binding liquid for bonding the particles. The infrared ray irradiating unit is configured and arranged to cure the binding liquid. The bulge detecting unit is configured and arranged to detect a bulge on the layers. The layer forming section and the infrared ray irradiating unit are configured and arranged to move in the same direction. When the bulge detecting unit detects the bulge with a height equal to or more than a predetermined height formed on one of the layers, the layer forming section is configured and arranged to adjust a thickness of a subsequent one of the layers, which is provided directly on the one of the layers where the bulge is detected.

In the three dimensional mold object manufacturing apparatus of the aspect, the layer forming section preferably has a raising and lowering stage and a planarizing unit configured and arranged to be relatively moved with respect to the raising and lowering stage and to planarize the composition which is applied to form the layers, and the layer forming section is preferably configured and arranged to adjust the thickness of the subsequent one of the layers by adjusting a lowering amount of the raising and lowering stage.

In the three dimensional mold object manufacturing apparatus of the aspect, the layer forming section is preferably configured and arranged to form the subsequent one of the layers with a standard thickness when the bulge detecting unit does not detect the bulge on the one of the layers with the height equal to or more than the predetermined height, and the layer forming section is preferably configured to form the subsequent one of the layers with a thickness where a value, which is determined based on a largest height out of heights of bulges, is added to the standard thickness when the bulge detecting unit detects one or more of the bulges with the height equal to or more than the predetermined height.

In the three dimensional mold object manufacturing apparatus of the aspect, when the largest height out of the heights of the bulges is Y (μm), the layer forming section is preferably configured and arranged to determine the thickness of the subsequent one of the layers in a range which is 1.05×Y or more and 1.5×Y or less when the bulge detecting unit detects one or more of the bulges with the height equal to or more than the predetermined height.

In the three dimensional mold object manufacturing apparatus of the aspect, the binding liquid applying unit is preferably configured and arranged to adjust a discharge amount of the binding liquid based on the thickness of the subsequent one of the layers where the thickness is adjusted due to detecting of the bulge.

In the three dimensional mold object manufacturing apparatus of the aspect, the composition preferably includes a volatile solvent and a water soluble resin in addition to the particles.

In the three dimensional mold object manufacturing apparatus of the aspect, the infrared ray irradiating unit is preferably configured and arranged to adjust output of the infrared rays based on the thickness of the subsequent one of the layers where the thickness is adjusted due to detecting of the bulge.

In the three dimensional mold object manufacturing apparatus of the aspect, the bulge detecting section preferably has a sensor configured and arranged to be relatively moved with respect to the layers.

In the three dimensional mold object manufacturing apparatus of the aspect, the bulge detecting section preferably has a sensor which is arranged so as to not relatively move with respect to the layers.

In the three dimensional mold object manufacturing apparatus of the aspect, it is preferable that the bulge detecting unit is preferably configured and arranged to determine the height of the bulge by determining a focal point distance from above a main surface of the one of the layers.

BRIEF DESCRIPTION OF THE DRAWINGS

Referring now to the attached drawings which form a part of this original disclosure:

FIGS. 1A to 1E are cross sectional diagrams schematically illustrating each process in an embodiment of a method for manufacturing a three dimensional mold object of the present embodiment.

DETAILED DESCRIPTION OF EXEMPLARY EMBODIMENTS

Figure 2A:
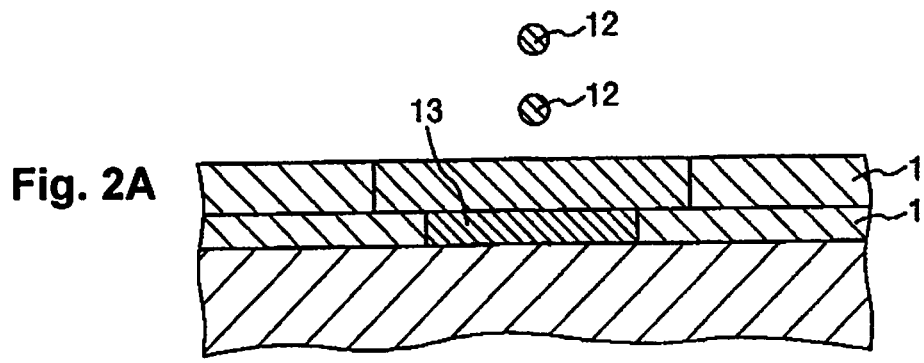
FIGS. 2A to 2D are cross sectional diagrams schematically illustrating each process in an embodiment of a method for manufacturing a three dimensional mold object of the present embodiment.
Figure 2B:
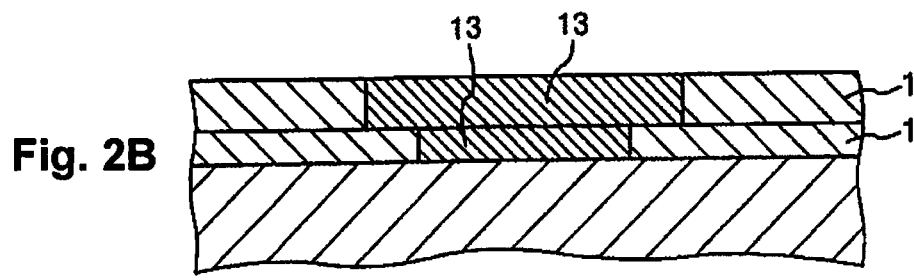
Figure 2C:
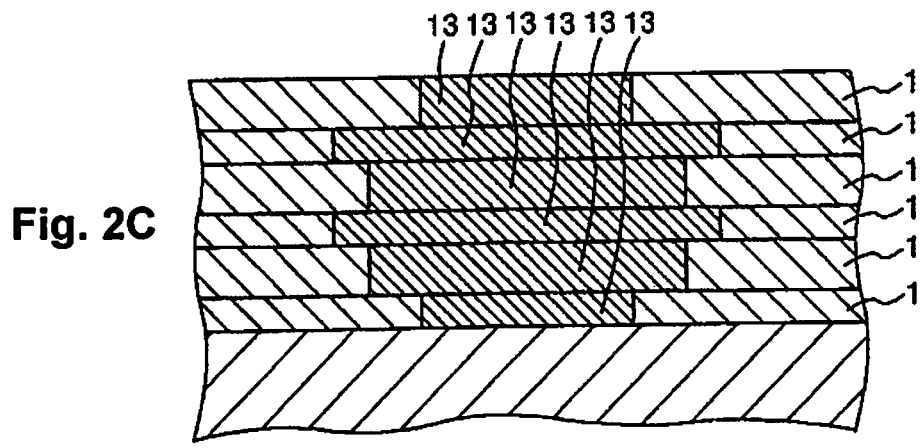
Figure 2D:
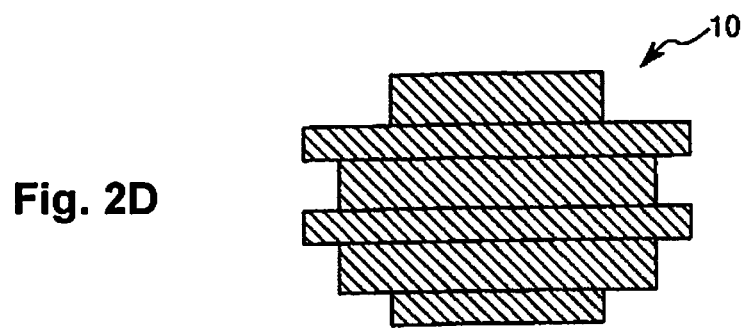

Embodiment of the present invention will be described in detail below with reference to the attached diagrams.

Method for Manufacturing Three Dimensional Mold Object

A method for manufacturing a three dimensional mold object of the present embodiment will be described first.

FIG. 1 and FIG. 2 are cross sectional diagrams schematically illustrating each process in an embodiment of a method for manufacturing a three dimensional mold object of the present embodiment.

As shown in FIGS. 1A to 1E and FIGS. 2A to 2D, the manufacturing method of the present embodiment has a layer forming process (1A and 1E) of forming a layer 1 with a predetermined thickness using a composition 11 which includes particles 111, a binding liquid applying process (1B and 2A) of applying a binding liquid 12 with regard to the layer 1 using an ink jet system, and a curing process (a bonding process) (1C and 2B) of curing a bonding agent 121 which is included in the binding liquid 12 which is applied to the layer 1 and forming a cured section (a bonded section) 13 in the layer 1 by bonding the particles 111, these processes are repeatedly performed in this order, and furthermore, after this, has a unbonded particles removing process (2D) of removing the particles III which are not bonded using the bonding agent 121 out of the particles 111 which configure each of the layers 1.

Then, prior to the second of the layer forming processes, a scanning process (1D) of checking for the presence or absence of bulges 9 with a height which is equal to or higher than a predetermined height is performed with regard to the layer 1 which is formed in the previous process (the layer where the bonded section is formed). That is, when any of a plurality of the layers 1 is a first layer, a process for forming the first layer is a first layer forming process, the layer 1 which is formed directly on the first layer is a second layer, and the process for forming the second layer is a second layer forming process, there is the scanning process of checking the presence or absence of a bulge with a height which is equal to or higher than a predetermined height on the first layer between the first layer forming process and the second layer forming process.

Then, in a case where the bulge 9 with a height which is equal to or higher than a predetermined height is detected in the scanning process, the thickness of the layer 1 (the second layer) is adjusted in the latter of the layer forming processes (the second layer forming process) based on the height of the bulge 9.

In this manner, in a case where the bulge 9 with a height which is equal to or higher than a predetermined height is detected on the layer 1 (the first layer) which is already formed, it is possible for disturbance of the layer 1 which is formed (the second layer) to be effectively prevented from being generated (for example, disturbance of the layer 1 due to the bulge 9 and a planarizing unit which forms the layer 1 coming into contact or the like) due to there being the bulge 9, for a three dimensional mold object 10 which is obtained as a final product to have superior dimensional precision, and for defects to be effectively prevented from being generated, when the layer 1 (the second layer) is formed by adjusting the thickness of the layer 1 (the second layer) which is formed afterwards based on the height of the bulge 9. In addition, since it is possible to form the layer 1 (the second layer) without removing the bulge 9, it is possible for the three dimensional mold object to have superior productivity.

Here, the thickness of the layer 1 which is to be formed (the second layer) need not be changed in the latter of the layer forming processes (the second layer forming process) in a case where the bulge 9 with a height which is equal to or higher than the predetermined height is not detected in the scanning process (in a case where the bulge 9 is not detected or in a case where the bulge 9 is detected but the height of the bulge 9 is lower than the predetermined height).

In addition, in the present embodiment, the terms of the "first layer" and the "second layer" indicate a relative relationship between any two layers out of the plurality of layers which configure the three dimensional mold object. In more detail, in a relationship where the scanning process is performed for an $n^{th}$ layer of the layer 1, the $n^{th}$ layer of the layer 1 is the "first layer" and an $n+1^{th}$ layer of the layer 1 is the "second layer", and in a relationship where the scanning process is performed for the $n+1^{th}$ layer of the layer 1 which follows, the $n+1^{th}$ layer of the layer 1 is the "first layer" and an $n+2^{th}$ layer of the layer 1 is the "second layer".

Each of the process will be described below.

Layer Forming Process

First, the layer 1 is formed with a predetermined thickness on a stage 41 using the composition (a three dimensional molding composition) 11 which includes the particles 111 (1A).

Here, the composition 11 will be described later.

In this process, the layer 1 is formed by the surface being planarized using the planarizing unit.

In the first of the layer forming processes, the layer 1 is formed with a thickness which is set in advance (a standard thickness $T_0$) (1A).

The standard thickness $T_0$ is not particularly limited, but the standard thickness $T_0$ is, for example, preferably 30 µm or more and 500 µm or less and is more preferably 70 µm or more and 150 µm or less. Due to this, it is possible for the three dimensional mold object 10 to have sufficiently superior productivity, for unintentional irregularities and the like to be more effectively prevented from being generated in the three dimensional mold object 10 which is manufactured, and for the three dimensional mold object 10 to have particularly superior dimensional precision.

In addition, in the second time onward of the layer forming processes (refer to 1e), the thickness of the layer 1 which is formed (the second layer) is as followed. That is, in the second time onward of the layer forming processes, the layer 1 (the second layer) is formed with the standard thickness $T_0$ which is set in advance in a case where the bulge 9 with a height which is equal to or higher than the predetermined height is not detected in the scanning process in the layer 1 (the first layer) which is already formed (in a case where the bulge 9 is not detected or in a case where the bulge 9 is detected but the height of the bulge 9 is lower than the predetermined height). In contrast to this, in the latter of the layer forming processes (the second layer forming process) in a case where one or more of the bulges 9 with a height which is equal to or higher than the predetermined height is detected in the layer 1 which is already formed (the first layer), the layer 1 (the second layer) is formed by adjusting the thickness based on the height of the bulge 9 (the largest height in the case where there are a plurality of the bulges 9) (refer to 1e). That is, the layer 1 (the second layer) is formed with a thickness which is larger than the standard thickness $T_0$. Due to this, it is possible to more effectively prevent defects from being generated in the three dimensional mold object 10 which is manufactured and it is possible for the three dimensional mold object 10 to have particularly superior dimensional precision.

The thickness of the layer 1 after adjusting (the thickness of the second layer) is not particularly limited in a case where one or more of the bulges 9 with a height which is equal to or higher than the predetermined height is detected in the previous scanning process, but when, for example, the largest height out of the heights of the bulges 9 which is detected in the previous scanning process is Y (µm), the thickness of the layer 1 (the second layer) is preferably 1.05 Y or more and 1.5 Y or less, is more preferably 1.10 Y or more and 1.40 Y or less, and even more preferably 1.15 Y or more and 1.35 Y or less. Due to this, it is possible to more effectively prevent defects from being generated in the three dimensional mold object 10 which is manufactured and it is possible for the three dimensional mold object 10 to have more superior dimensional precision.

Here, the thickness of the second layer, in a case where one or more of the bulges 9 with a height which is equal to or higher than the predetermined height is detected in the previous scanning process, may be a variable value (for example, a value where a proportional relationship is established) according to the height of the bulge 9 with a height which is equal to or higher than the predetermined height which is detected in the first layer or may be a fixed value irrespective of the specific height of the bulge 9 which is detected in the first layer.

Binding Liquid Applying Process

After the layer 1 is formed in the layer forming process, the binding liquid 12 for bonding the particles 111 which configure the layer 1 is applied with regard to the layer 1 using an ink jet system (1B and 2A).

In this process, the binding liquid 12 is selectively applied only to portions of the layer 1 which correspond to actual sections (portions which are to be solid) of the three dimensional mold object 10.

Due to this, it is possible to strongly bond together the particles 111 which configure the layer 1 and to form the cured section (bonded section) 13 with a desired shape as a final product. In addition, it is possible for the three dimensional mold object 10 which is obtained as a final product to have superior mechanical strength.

In this process, it is possible to apply the binding liquid 12 with favorable reproduction even when patterns for applying the binding liquid 12 are fine shapes since the binding liquid 12 is applied using an ink jet system. As a result, it is possible for the dimensional precision of the three dimensional mold object 10 which is obtained as a final product to be particularly high.

In addition, in a case where the thickness of the layer 1, where the binding liquid 12 is to be applied in this process, is adjusted to a thickness which is larger than the standard thickness $T_0$, the amount of the binding liquid 12 to be applied in this process is adjusted based on the thickness of the layer 1 (in proportion to the standard thickness $T_0$) (refer to 2A). Due to this, it is possible to apply the binding liquid 12 in an amount which is necessarily sufficient and it is possible to reliably form the bonded section 13 in the desired pattern. In addition, it is possible to reliably obtain the desired color tone in a case where a coloring agent is included in the binding liquid 12 and it is possible to reliably prevent unintentional changes in color tone and unintentional breakdown of the color balance in accompaniment with changes in the thickness of the layer 1.

Here, the binding liquid 12 will be described later.

Curing Process (Bonding Process)

After applying of the binding liquid 12 to the layer 1 in the binding liquid applying process, the bonding agent 121, which is included in the binding liquid 12 which is applied to the layer 1, is cured and the cured section (the bonded section) 13 is formed (1C and 2B). Due to this, it is possible to have particular superior bonding strength between the bonding agent 121 and the particles 111, and as a result, it is possible for the three dimensional mold object 10 which is obtained as a final product to have particular superior mechanical strength.

This process differs depending on the type of the bonding agent 121, but, for example, it is possible to be performed by heating in a case where the bonding agent 121 is a thermosetting resin and it is possible to be performed by irradiating with corresponding light in a case where the bonding agent 121 is a photo-curable resin (for example, it is possible to be performed by irradiating ultraviolet rays in a case where the bonding agent 121 is an ultraviolet ray curable resin).

Here, the binding liquid applying process and the curing process may be performed so as to progress at the same time. That is, a curing reaction may progress sequentially from a portion where the binding liquid 12 is applied before the whole pattern of the entirety of one of the layers 1 is formed.

In addition, it is possible for this process to be omitted in a case where, for example, the bonding agent 121 does not have a curable component. In this case, the binding liquid applying process described above may also act as the bonding process.

Scanning Process

In the scanning process, there is checking for the presence or absence of the bulge 9 with a height which is equal to or more than the predetermined height on the layer 1 (the first layer) where the bonded section 13 is formed (1D).

Here, it is possible for the "predetermined height" to be set based on the possibility that a defect (disturbing of the surface or the like) will be generated in the layer 1 (the second layer) in a case where the layer 1 which is new (the second layer) is formed with the standard thickness $T_0$ on the layer 1 (the first layer) where the bonded section 13 is formed.

Then, it is possible for the "predetermined height" to be set based on, for example, the standard thickness $T_0$, the particles diameter of the particles 111, or the like.

For example, it is possible for the "predetermined height" to be 0.5 $T_0$ (μm) or more and 2 $T_0$ (μm) or less with regard to the standard thickness $T_0$.

In addition, when the average particle diameter of the particles 111 is D (μm), it is possible for the "predetermined height" to be, for example, 0.5 D (μm) or more and 2 D (μm) or less. Here, the average particle diameter in the present embodiment refers to the volume average particle diameter and it is possible to determine by, for example, adding methanol to a sample and measuring a dispersion liquid, which is dispersed for three minutes using an ultrasonic dispersing unit, with a Coulter counter type of particle size distribution measuring unit (type TA-II manufactured by Coulter Electronics Inc.) with an aperture of 50 μm.

In particular, by performing the scanning process with regard to the first layer after the bonding process with regard to the first layer (and immediately before performing the second layer forming process) in the present embodiment, it is possible to more effective prevent the shape of the bulge 9 changing and the bulges 9 newly forming due to foreign matter and the like which is new before the second layer forming process, and it is possible to form the layer 1 (the second layer) with a more appropriate thickness in the second layer forming process.

In addition to foreign matter which is not originally assumed to be included as a configuring component of the three dimensional mold object, the bulge 9 also includes the composition 11 as a source (in particular, the particles 111 as a source).

Here, it is sufficient if the bulges 9 with a height which is equal to or more than the predetermined height are detected in the scanning process and detecting need not be performed for, for example, the bulges 9 with a height which is equal to or less than a threshold.

The series of processes described above are repeatedly performed. Due to this, there is a state where the particles 111 are bonded in portions where the binding liquid 12 are applied out of each of the layers 1 and the three dimensional mold object 10, which is a layered body where a plurality of the layers 1 are layered in this state, is obtained (refer to 2C).

In addition, the binding liquid 12, which is applied to the layer 1 in the second time onward of the binding liquid applying processes (refer to 1D), is used to bond together the particles 111 which configure the layer 1, and a portion of the binding liquid 12 which is applied penetrates beneath the layer 1. For this reason, the binding liquid 12 is used to not only bond together the particles 111 in each of the layers 1 but to bond together the particles 111 between adjacent layers. As a result, the three dimensional mold object 10 which is obtained as a final product has superior overall mechanical strength.

Here, the scanning process is not performed with the layer 1 which is formed last in the present embodiment.

Unbonded Particles Removing Process

Then, the unbonded particles removing process (2D) of removing the particles 111 which are not bonded using the bonding agent 121 (the unbonded particles) out of the particles 111 which configure each of the layers 1 is performed in a post-processing process after the series of process as described above is repeatedly performed. Due to this, the three dimensional mold object 10 is taken out.

As the detail method of this process, there are the examples of, for example, a method of wiping away the unbonded particles using a brush or the like, a method of removing the unbonded particles using suction, a method of blowing a gas such as air, a method of applying a liquid such as water (for example, a method of immersing the layered body which is obtained as above in a liquid, a method of blowing a liquid, or the like), a method of applying vibration using ultrasonic vibration or the like, and the like. In addition, it is possible to perform a combination of any two or more types of methods which are selected from above. In more detail, there are the examples of a method of immersing in a liquid such as water after blowing a gas such as air, a method of applying ultrasonic vibration in a state of being immersed in a liquid such as water. Among these, it is preferable that a method is adopted where a liquid which includes water is applied with regard to the layered body which is obtained as described above (in particular, a method of immersing in a liquid which includes water).

In the description above, forming of the bonded section is described as being performing using the binding liquid, but forming of the bonded section may be performed using any method in the manufacturing method of the present embodiment and may be performed, for example, by fusing (sintering and joining) the particles 111 by irradiating energy rays. In a case where forming of the bonded section is performed using this method in the prior art, it is particularly easy for unintentional bulges to be formed and it is difficult to obtain the three dimensional mold object with superior dimensional precision where defects are effectively prevented from being generated. In addition, in this method, removing the bulge is considered, but productivity of the three dimensional mold object is remarkable reduced in this case. In addition, the bulge which are generated in this method are often fused (sintered) due to irradiating of energy rays and it is easy for defects to be generated in the bonded section which accompanies removing the bulges since a relatively large force is necessary for removing the bulges. In contrast to this, it is possible to effectively prevent the problems described above from being generated in the present embodiment even in a case where forming of the bonded section is performed by fusing (sintering and joining) the particles due to irradiating of energy rays. That is, the effects of the present embodiment are more remarkable exhibited in a case where forming of the bonded section is performed by fusing (sintering and joining) the particles due to irradiating of energy rays.

According to the manufacturing method of the present embodiment as described above, it is possible to effectively manufacture the three dimensional mold object with superior dimensional precision where defects are effectively prevented from being generated. In particular, it is possible for the three dimensional mold object to have superior productivity in the present embodiment since removing of the bulges and a layer re-planarizing process (a planarizing process for alleviating and eliminating disturbance to the layer which accompanies removing of the bulge) are not necessary. In addition, increasing of the time which is necessary for manufacturing the three dimensional mold object is effectively prevented in a case where the size of the bulge is large and in a case where the number of the bulges is large.

Three Dimensional Mold Object Manufacturing Apparatus

A three dimensional mold object manufacturing apparatus of the present embodiment will be described first.

Figure 3:
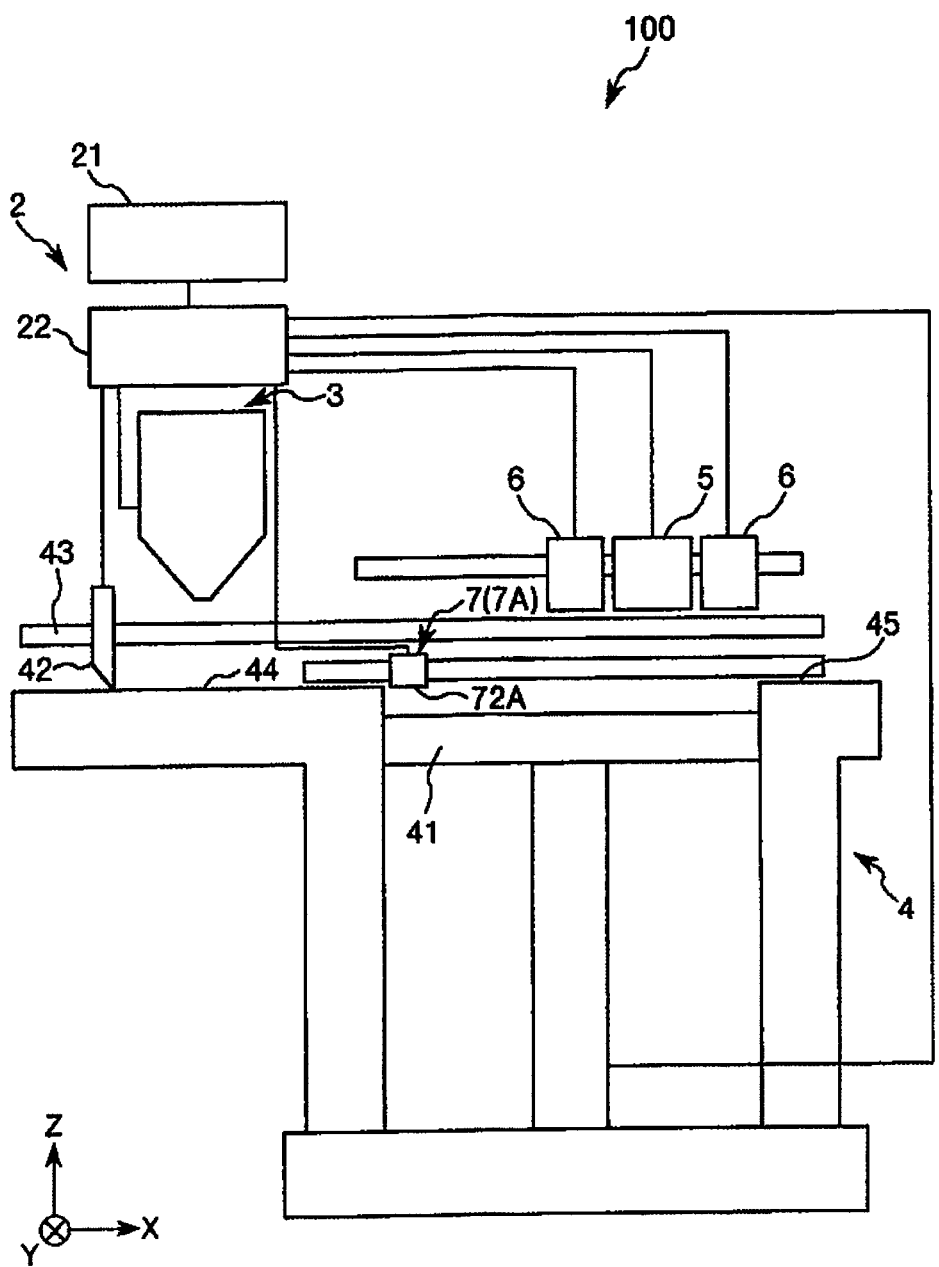
FIG. 3 is a cross sectional diagram schematically illustrating an embodiment of a three dimensional mold object manufacturing apparatus of the present embodiment.
Figure 4:
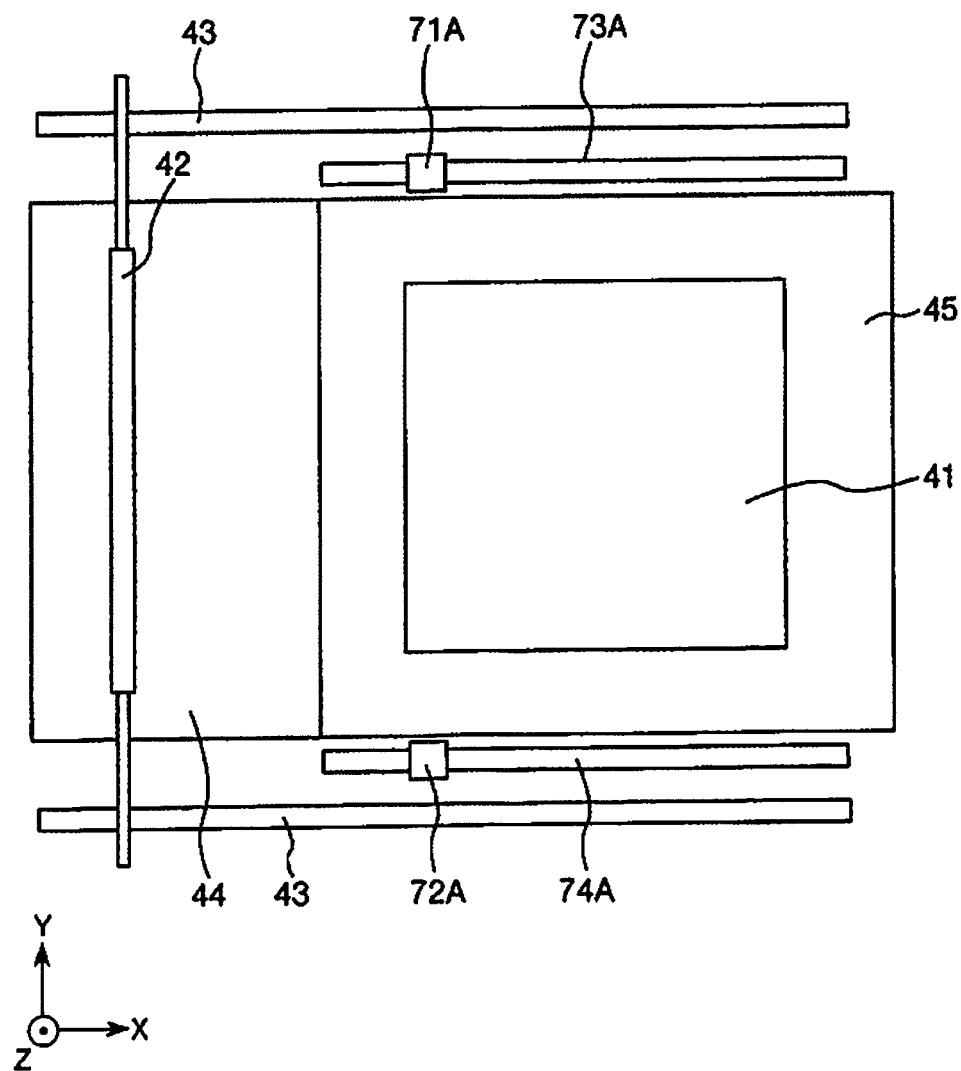
FIG. 4 is a planar diagram for explaining the positional relationship between a layer forming section and a bulge detecting unit in the three dimensional mold object manufacturing apparatus shown in FIG. 3.
Figure 5:
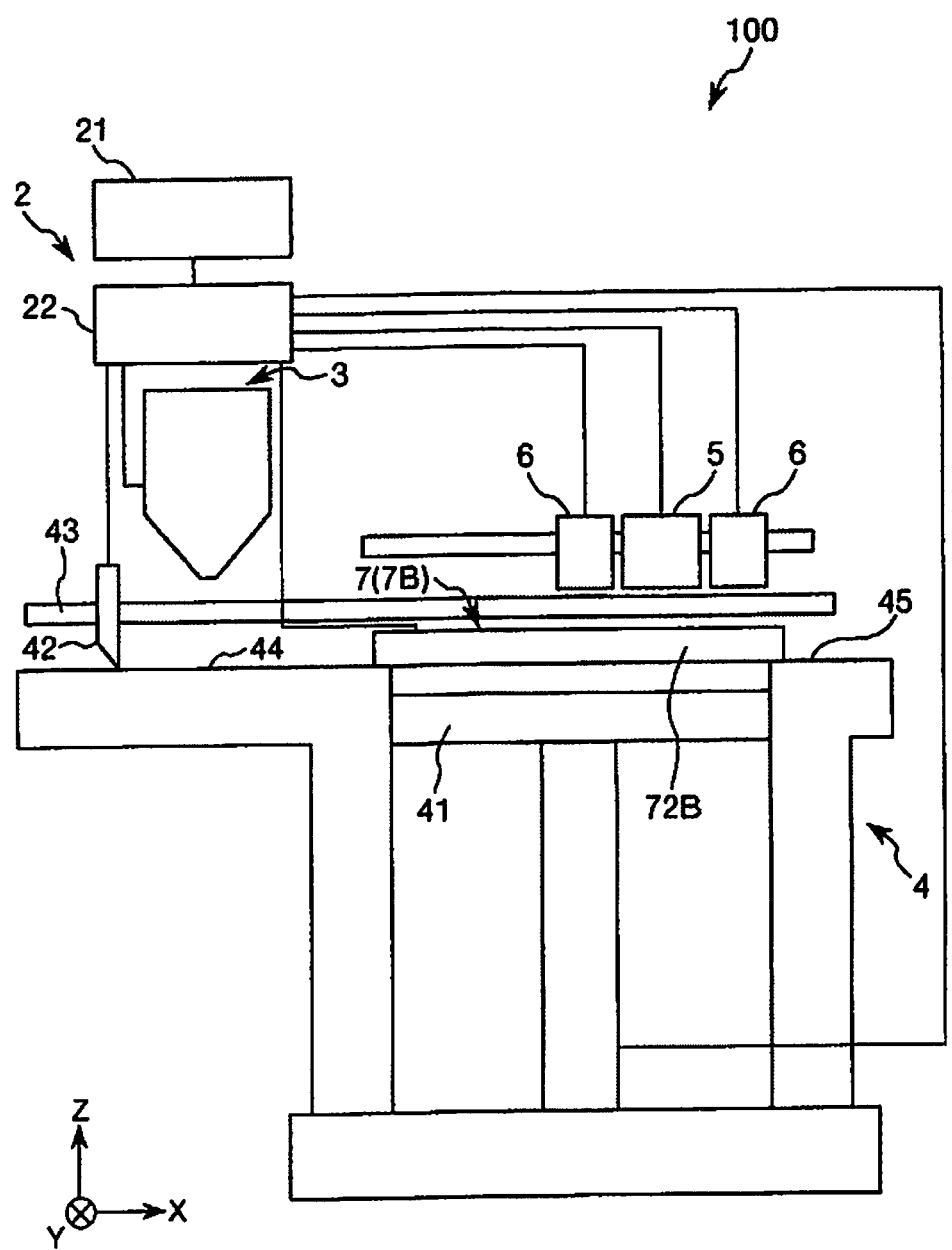
FIG. 5 is a cross sectional diagram schematically illustrating another embodiment of a three dimensional mold object manufacturing apparatus of the present embodiment.
Figure 6:
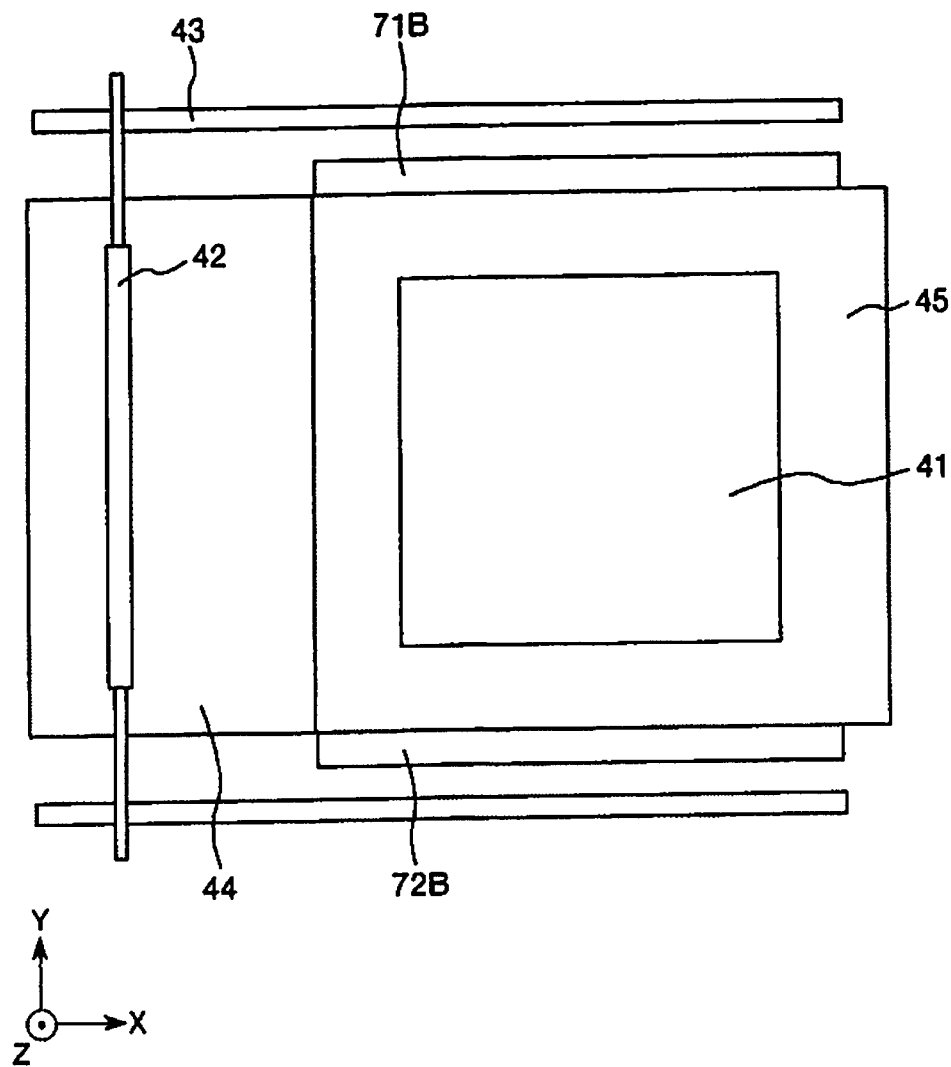
FIG. 6 is a planar diagram for explaining the positional relationship between a layer forming section and a bulge detecting unit in the three dimensional mold object manufacturing apparatus shown in FIG. 5.
Figure 7:
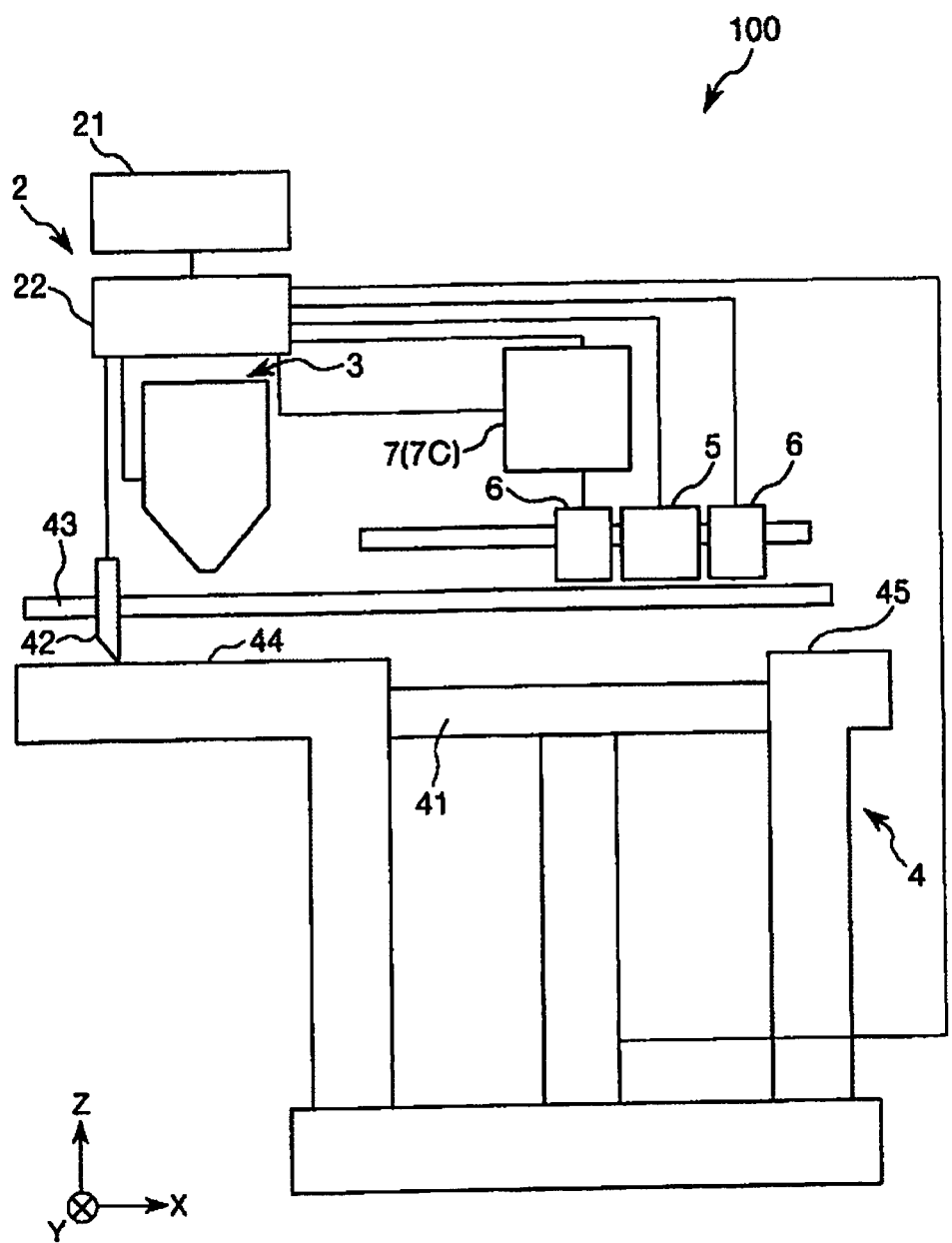
FIG. 7 is a cross sectional diagram schematically illustrating another embodiment of a three dimensional mold object manufacturing apparatus of the present embodiment.

FIG. 3 is a cross sectional diagram schematically illustrating an embodiment of the three dimensional mold object manufacturing apparatus of the present embodiment, FIG. 4 is a planar diagram for explaining the positional relationship between the layer forming section and the bulge detecting unit in the three dimensional mold object manufacturing apparatus shown in FIG. 3, FIG. 5 is a cross sectional diagram schematically illustrating another embodiment of the three dimensional mold object manufacturing apparatus of the present embodiment, FIG. 6 is a planar diagram for explaining the positional relationship between the layer forming section and the bulge detecting unit in the three dimensional mold object manufacturing apparatus shown in FIG. 5, and FIG. 7 is a cross sectional diagram schematically illustrating another embodiment of the three dimensional mold object manufacturing apparatus of the present embodiment.

A three dimensional mold object manufacturing apparatus 100 manufactures the three dimensional mold object 10 by repeatedly forming and layering the layers 1 using the composition (the three dimensional molding composition) 11 which includes the particles 111.

As shown in FIG. 3, the three dimensional mold object manufacturing apparatus 100 has a control section 2, a composition supplying section 3 which contains the composition 11 which includes the particles 111, a layer forming section 4 which forms the layers 1 using the composition 11 which is supplied from the composition supplying section 3, a binding liquid discharging section (a binding liquid applying unit) 5 which discharges the binding liquid 12 onto the layer 1, an energy ray irradiating unit (a curing unit) 6 which irradiates energy rays for curing the binding liquid 12, and a bulge detecting unit 7 which detects the bulges 9 on the layer 1 (in the same manner as the three dimensional mold object manufacturing apparatus 100 shown in FIGS. 5 and 7).

The control section 2 has a computer 21 and a drive control section 22.

The computer 21 is a typical desktop computer or the like which is configured by a CPU, a memory, or the like being internally provided. The computer 21 creates data which is model data of the shape of the three dimensional mold object 10 and outputs cross sectional data, which is obtained by slicing the model data into numerous thin cross sectional bodies which are parallel to each other (slice data), with regard to the drive control section 22. In addition, in a case where the bulge 9 is detected using the bulge detecting unit 7 which will be described later and the thickness of the layer 1 (the second layer) is adjusted based on the height of the bulge 9, rewriting (correction) of the cross sectional data (the slice data) is performed based on the thickness of the layer 1 (the second layer).

The drive control section 22 functions as a control means which drives the layer forming section 4, the binding liquid discharging section 5, the energy ray irradiating unit 6, the bulge detecting unit 7, and the like. In detail, for example, the discharge pattern and the discharge amount of the binding liquid 12 from the binding liquid discharging section 5, the supply amount of the composition 11 from the composition supplying section 3, the lowering amount of the raising and lowering state 41, and the like are controlled.

The composition supplying section 3 is configured so as to move due to commands from the drive control section 22 and supply the composition 11 which is contained inside of the composition supplying section 3 to a composition temporary retaining section 44.

The layer forming section 4 has the composition temporary retaining section 44 which temporarily holds the composition 11 which is supplied from the composition supplying section 3, a squeegee (a planarizing unit) 42 which planarizes the composition 11 which is held by the composition temporary retaining section 44 and forms the layer 1, a guide rail 43 which regulates the actions of the squeegee 42, a raising and lowering stage (the stage) 41 which supports the layer 1 which is formed, and a frame body 45 which is provided so as to surround the raising and lowering stage 41 and to tightly fit with the raising and lowering stage 41.

The raising and lowering stage 41 is sequentially lowered by a predetermined amount due to commands from the drive control section 22 when forming the layer 1 which is new on the layer 1 which is already formed. The thickness of the layer 1 which is newly formed is established due to the lowering amount of the raising and lowering stage 41. For example, in a case where the bulge 9 with a height which is equal to or higher than the predetermined height is detected on the layer 1 (the first layer) which is formed at this time by the bulge detecting unit 7, it is possible to adjust the thickness of the layer 1 (the second layer) which is provided directly on the layer 1 (the first layer) where the bulge 9 is detected by adjusting the lowering amount of the raising and lowering stage 41 based on the height of the bulge 9. Due to this configuration, it is possible to more easily and suitably adjust the thickness of the layer 1 (the second layer) which is provided directly on the layer 1 (the first layer) where the bulge 9 with a height which is equal to or more than the predetermined height is detected.

The stage 41 planarizes the surface (the portion where the composition 11 is applied). Due to this, it is possible to easily and reliably form the layer 1 with high uniformity of thickness.

It is preferable that the stage 41 be configured of a material with high strength. As the configuring material of the stage 41, there are the examples of, for example, various types of metallic materials such as stainless steel.

In addition, surface processing may be carried out on the surface of the stage 41 (the portion where the composition 11 is applied). Due to this, it is possible to, for example, effectively prevent the configuring materials of the composition 11 and the configuring materials of the binding liquid 12 from becoming attached to the stage, have particularly superior durability of the stage 41, and achieve stable productivity of the three dimensional mold object 10 over a longer period of time. As the material which is used in the surface processing on the surface of the stage 41, there are the examples of, for example, a fluorine resin such as polytetrafluoroethylene.

The squeegee 42 has a longitudinal shape which extends in the X direction and is provided with a blade which has a shape with an edge where a front tip of a lower portion is sharp.

Since the layer 1 which is formed by the composition 11 being planarized using the squeegee 42 is appropriately adjusted as required based on information such as the presence or absence and the height of the bulge 9 using the bulge detecting unit 7, disturbance of the layer 1 or the like due to the bulge 9 and the squeegee 42 coming into contact or the like is effectively prevented.

A vibration mechanism (which is not shown in the diagram) which applies slight vibrations to the blade may be provided so that the length of the blade in the Y direction smoothly performs spreading of the composition 11 using the squeegee 42.

The binding liquid discharging section (the binding liquid applying unit) 5 discharges the binding liquid 12 onto the layer 1 using an ink jet system. Due to the binding liquid discharging section (the binding liquid applying unit) 5 being provided, it is possible to apply the binding liquid 12 with a fine pattern and it is possible to particularly productively manufacture even the three dimensional mold object 10 which has a fine structure.

As the liquid droplet discharging method (the method of the ink jet system), it is possible to use a piezoelectric method, a method where the binding liquid 12 is discharged using foam (bubbles) which are generated by heating the binding liquid 12, and the like, but the piezoelectric method is preferable from the point of view of difficulties with changing the properties of the configuring components of the binding liquid 12.

The binding liquid discharging section (the binding liquid applying unit) 5 controls the amount of the binding liquid 12 which is applied to each section of the layer 1 as the pattern which is to be formed on each of the layers 1 due to commands from the drive control section 22. The discharge pattern, the discharge amount, and the like of the binding liquid 12 from the binding liquid discharging section (the binding liquid applying unit) 5 is determined based on the slice data. Accordingly, for example, in a case where the thickness of the layer 1 which is to be applied to the binding liquid 12 is adjusted to be thicker than the standard thickness $T_0$, the applying amount of the binding liquid 12 with regard to the layer 1 is adjusted based on the thickness of the layer 1 (in proportion to the standard thickness $T_0$). Due to this, it is possible to apply the binding liquid 12 in an amount which is necessarily sufficient, it is possible to reliably form the bonded section 13 in the desired pattern, and it is possible for the three dimensional mold object 10 to have more reliably superior dimensional precision and mechanical strength. In addition, it is possible to reliably obtain the desired color tone in a case where a coloring agent is included in the binding liquid 12 and it is possible to reliably prevent unintentional changes in color tone and unintentional breakdown of the color balance in accompaniment with changes in the thickness of the layer 1.

The energy ray irradiating unit (the curing unit) 6 irradiates energy rays for curing the binding liquid 12 which is applied to the layer 1.

The type of energy ray which is irradiated from the energy ray irradiating unit 6 differs according to the configuring material of the binding liquid 12, and there are the examples of, for example, ultraviolet rays, visible light rays, infrared rays, X rays, y rays, electron rays, ion beams, and the like. Among these, it is preferable that ultraviolet rays are used from the point of view of cost and productivity of the three dimensional mold object.

The bulge detecting unit 7 detects the bulges 9 on the layer 1 (the first layer).

Information on the presence or absence of the bulge 9 with a height which is equal to or higher than the predetermined height, information on the largest height of the bulges 9 in a case where there are the bulges 9 with a height which is equal to or higher than the predetermined height, and the like is sent from the bulge detecting unit 7 to the control section 2 and is used in adjusting the thickness of the layer 1 (the second layer).

In the configuration shown in FIG. 3 and FIG. 4, the bulge detecting section 7 (7A) has a light emitting section 71A which irradiates light, a light receiving section 72A which receives light from the light emitting section 71A which is reflected, a guide rail 73A which regulates the actions of the light emitting section 71A, and a guide rail 74A which regulates the actions of the light receiving section 72A. Then, due to the light emitting section 71A and the light receiving section 72A being coupled and being moved in the X direction by a driving section, the whole region on the raising and lowering stage 41, where the layer 1 is provided when viewed in a planar view, is scanned and there is checking for the presence and absence of the bulges 9 with a height which is equal to or more than the predetermined height over the entire surface of the layer 1. Due to this configuration, for example, it is possible to appropriately adopt a line sensor which has higher resolution as the light receiving section 72A and it is possible to determine the height of the bulge 9 more accurately in a case where there are the bulges 9 on the layer 1.

In addition, in the configuration shown in FIG. 5 and FIG. 6, the bulge detecting section 7 (7B) has a light emitting section 71B which irradiates light and a light receiving section 72B which receives light from the light emitting section 71B which is reflected, and the light emitting section 71B and the light receiving section 72B have a longitudinal shape which is provided to extend over a range which includes the entirety of the layer 1 in the width direction (the X direction). Then, the light emitting section 71B and the light receiving section 72B are provided to be fixed to the frame body 45 of the layer forming section 4 so as to not relatively move with regard to the layer 1. Due to this configuration, since it is possible to check for the presence and absence of the bulges 9 with a height which is equal to or more than the predetermined height over the entire surface of the layer 1 without moving the bulge detecting unit 7 (the light emitting section 71B and the light receiving section 72B), it is possible to shorten the time which is necessary for the scanning process and it is possible for the three dimensional mold object 10 to have particularly superior productivity. In addition, since there are a fewer number of axes in the three dimensional mold object 10, it is possible to simplify the apparatus configuration and achieve lower costs.

In addition, in the configuration shown in FIG. 7, the bulge detecting section 7 (7C) determines the height of the bulge 9 by determining the focal point distance from above the main surface of the layer 1. Due to this configuration, since it is possible to check the presence or absence of the bulge 9 with a height which is equal to or higher than the predetermined height across the entire surface of the layer 1 without moving the bulge detecting unit 7, it is possible to shorten the time which is necessary for the scanning process and it is possible for the three dimensional mold object 10 to have particularly superior productivity. In addition, it is possible to determine not only the height of the bulge 9 but accurate coordinates of the bulge 9 in the XY plane.

In the description above, the three dimensional mold object manufacturing apparatus has the binding liquid discharging section (the binding liquid applying unit) and the energy ray irradiating unit (the curing section), and the cured section (the bonded section) is formed using these, but the three dimensional mold object manufacturing apparatus of the present embodiment is not limited to being provided with this configuration as the means for forming the bonded section and may be provided with, for example, an energy ray irradiating unit which irradiates energy rays in order to fuse (sinter and join) the particles instead of the binding liquid discharging section (the binding liquid applying unit) and the energy ray irradiating unit (the curing section). In an apparatus which has a configuration where the particles are fused (sintered and joined) using energy rays in the prior art, it is particularly easy for unintentional bulges to be formed and it is difficult to obtain the three dimensional mold object with superior dimensional precision where defects are effectively prevented from being generated. In addition, in an apparatus which has a configuration where the particles are fused (sintered and joined) using energy rays in the prior art, removing the bulge is considered, but productivity of the three dimensional mold object is remarkable reduced in this case. In addition, the bulge which are generated in this apparatus are often fused (sintered) due to irradiating of energy rays and it is easy for defects to be generated in the bonded section which accompanies removing the bulges since a relatively large force is necessary for removing the bulges. In contrast to this, it is possible to effectively prevent the problems described above from being generated in the present embodiment even in a case where forming of the bonded section is performed by fusing (sintering and joining) the particles due to irradiating of energy rays. That is, the effects of the present embodiment are more remarkable exhibited in a case where forming of the bonded section is performed by fusing (sintering and joining) the particles due to irradiating of energy rays.

In a case where the three dimensional mold object manufacturing apparatus is provided with the energy ray irradiating unit which irradiates energy rays in order to fuse (sinter and join) the particles, the energy ray irradiating unit controls the energy amount of the energy rays, which are irradiated as a pattern to be formed on each of the layers 1 (an energy ray irradiating pattern) onto each section of the layer 1, using commands from the drive control section 22. The energy amount, the irradiating pattern, and the like of the energy rays from the energy ray irradiating unit are determined based on the slice data. Accordingly, the amount of irradiating energy (the output of the energy rays) which is the energy amount with regard to the layer 1 is adjusted based on the thickness of the layer 1 (in proportion to the standard thickness $T_0$) in a case where, for example, the thickness of the layer 1 onto which energy rays are to be irradiated is adjusted to a thickness which is larger than the standard thickness $T_0$. Due to this, it is possible to irradiate the energy rays with an energy amount which is necessarily sufficient, it is possible to more reliably form the bonded section 13 in the desired pattern, and it is possible for the three dimensional mold object 10 to have more reliably superior dimensional precision and mechanical strength. It is possible to perform adjusting of the output of the energy rays by, for example, adjusting the strength (power), the irradiating time, and the like of the energy rays which are irradiated.

According to the three dimensional mold object manufacturing apparatus of the present embodiment as described above, it is possible to effectively manufacture the three dimensional mold object with superior dimensional precision where defects are effectively prevented from being generated. In particular, it is possible for the three dimensional mold object to have superior productivity in the present embodiment since removing of the bulges and layer re-planarizing processing (planarizing processing for alleviating and eliminating disturbance to the layer which accompanies removing of the bulge) are not necessary. In addition, increasing of the time which is necessary for manufacturing the three dimensional mold object is effectively prevented in a case where the size of the bulge is large and in a case where the number of the bulges is large. In addition, it is possible to reliably prevent adverse effects such as an increase in size, complicated structure, or higher costs since it is not necessary for the three dimensional mold object manufacturing apparatus to be provided with a bulge removing means.

Binding Liquid

Next, the binding liquid which is used in manufacturing the three dimensional mold object of the present embodiment will be described in detail.

The binding liquid 12 includes at least the bonding agent 121.

Bonding Agent

The bonding agent 121 may be any agent as long as it has the function of bonding the particles 111 and preferably have hydrophobicity (lipophilic) in a case where the particles 111 have porous holes 1111 which will be described later and the particles 111 where hydrophobic processing is carried out are used. Due to this, it is possible to have a high affinity between the binding liquid 12 and the particles 111 on which the hydrophobic processing is carried out and it is possible for the binding liquid 12 to appropriately penetrate into the porous holes 1111 of the particles 111 on which the hydrophobic processing is carried out due to the binding liquid 12 being applied to the layer 1. As a result, it is possible for an anchor effect to be appropriately exhibited using the bonding agent 121 and it is possible for the three dimensional mold object 10 which is obtained as a final product to have particularly superior mechanical strength. Here, it is sufficient if the binding agent which is hydrophobic has a sufficiently low affinity with regard to water, but it is preferable that the solubility with regard to water at 25° C. is, for example, equal to or less than 1 (g/100 g of water).

As the bonding agent 121, there are the examples of, for example, thermoplastic resins, thermosetting resins, various types of photocurable resins such as visible light curable resins which are cured using the spectrum of visible light (photocurable resins in a narrow sense), ultraviolet ray curable resins, and infrared curable resins, X-ray curable resins, and the like, and it is possible to use one type or a combination of two or more types which are selected from these. Among these, it is preferable that the bonding agent 121 includes a curable resin from the point of view of mechanical strength of the three dimensional mold object 10 which is obtained, productivity of the three dimensional mold object 10, and the like. In addition, among the various types of curable resins, ultraviolet ray curable resins (polymerizable compounds) are particularly preferable from the point of view of mechanical strength of the three dimensional mold object 10 which is obtained, productivity of the three dimensional mold object 10, safe storage of the bonding agent 121, and the like.

As the ultraviolet ray curable resins (polymerizable compounds), it is preferable to use a resin where addition polymerization or ring-opening polymerization is started and a polymer is generated due to a radial type or a cation type which is generated from a photopolymerization initiator due irradiating of ultraviolet rays. As the addition polymerization format, there are the examples of radial, cation, anion, metathesis, and coordination polymerization. In addition, as the ring-opening polymerization format, there are the examples of cation, anion, radial, metathesis, and coordination polymerization.

As the addition polymerizable compound, there are the examples of, for example, a compound which has at least one ethyleny unsaturated double bond and the like. As the addition polymerizable compound, it is possible to preferably use a compound with at least one or more preferable two or more terminal ethyleny unsaturated bonds.

The polymerizable compound with the ethyleny unsaturated bond has a chemical form of a monofunctional polymerizable compound, a polyfunctional polymerizable compound, or a mixture of these. As the monofunctional polymerizable compound, there are the examples of, for example, unsaturated carboxylic acids (for example, acrylic acids, methacrylic acids, itaconic acids, crotonic acids, isocrotonic acids, maleic acids, and the like) and esters, amides, and the like of the unsaturated carboxylic acids. As the polyfunctional polymerizable compound, an ester of an unsaturated carboxylic acid and an aliphatic polyalcohol compound, an amide of an unsaturated carboxylic acid and an aliphatic polyamine compound, and the like are used.

In addition, it is possible to also use an addition reactant with an ester, amide, isocyanate, or epoxy of unsaturated carboxylic acid which has a nucleophilic substituent such as a hydroxyl group, an amino group, or a mercapto group or a dehydration condensation reactant with the carboxylic acid. In addition, it is possible to also use an addition reactant with an ester, amide, alcohol, amine, or thiol of unsaturated carboxylic acid which has an electrophilic substituent such as an isocyanate group or an epoxy group and a substitution reactant with an ester, amide, alcohol, amine, or thiol of unsaturated carboxylic acid which has a detaching substituent group such as a halogen group or a tosyloxy group.

As specific examples of a radical polymerizable compound which is an ester of an unsaturated carboxylic acid and an aliphatic polyalcohol compound, for example, (meth) acrylate ester is representative and it is possible to use monofunctional and polyfunctional (meth) acrylate esters.

As specific examples of monofunctional (meth) acrylate, there are the examples of, for example, tolyloxy methyl ethyl (meth) acrylate, phenyloxy ethyl (meth) acrylate, cyclohexyl (meth) acrylate, ethyl (meth) acrylate, methyl (meth) acrylate, isobornyl (meth) acrylate, tetrahydro furfuryl (meth) acrylate, and the like.

As specific examples of bifunctional (meth) acrylate, there are the examples of, for example, ethylene glycol di(meth) acrylate, triethylene glycol di(meth) acrylate, 1,3-butanediol di(meth) acrylate, tetramethylene glycol di(meth) acrylate, propylene glycol di(meth) acrylate, neopentyl glycol di(meth) acrylate, hexanediol di(meth) acrylate, 1,4-cyclohexane diol di(meth) acrylate, tetraethylene glycol di(meth) acrylate, pentaerythritol di(meth) acrylate, dipentaerythritol di(meth) acrylate, and the like.

As specific examples of trifunctional (meth) acrylate, there are the examples of, for example, trimethylolpropane tri(meth) acrylate, trimethylolpropane tri(meth) acrylate, trimethylolpropane alkylene oxide-modified tri(meth) acrylate, pentaerythritol tri(meth) acrylate, dipentaerythritol tri (meth) acrylate, trimethylolpropane tri((meth) acryloyloxy propyl) ether, isocyanurate alkylene oxide-modified tri (meth) acrylate, propionate dipentaerythritol tri(meth) acrylate, tri((meth) acryloyloxyethyl) isocyanurate, hydroxypivalaldehyde-modified dimethylol propane tri (meth) acrylate, sorbitol tri(meth) acrylate, and the like.

As specific examples of tetrafunctional (meth) acrylate, there are the examples of, for example, pentaerythritol tetra(meth) acrylate, sorbitol tetra(meth) acrylate, ditrimethylolpropane tetra(meth) acrylate, propionate dipentaerythritol tetra(meth) acrylate, ethoxylated pentaerythritol tetra (meth) acrylate, and the like.

As specific examples of pentafunctional (meth) acrylate, there are the examples of, for example, sorbitol penta(meth) acrylate, dipentaerythritol penta(meth) acrylate, and the like.

As specific examples of hexafunctional (meth) acrylate, there are the examples of, for example, dipentaerythritol hexa(meth) acrylate, sorbitol hexa(meth) acrylate, phosphazene alkylene oxide-modified hexa(meth) acrylate, caprolactone-modified dipentaerythritol hexa(meth) acrylate, and the like.

As polymerizable compounds other than (meth) acrylate, there are the examples of, for example, itaconic acid esters, crotonic acid esters, isocrotonic acid esters, maleic acid esters, and the like.

As the itaconic acid esters, there are the examples of, for example, ethylene glycol diitaconate, propylene glycol diitaconate, 1,3-butanediol diitaconate, 1,4-butanediol diitaconate, tetramethylene glycol diitaconate, pentaerythritol diitaconate, sorbitol tetraitaconate, and the like.

As the crotonic acid esters, there are the examples of, for example, ethylene glycol dicrotonate, tetramethylene glycol dicrotonate, pentaerythritol dicrotonate, sorbitol tetra dicrotonate, and the like.

As the isocrotonic acid esters, there are the examples of, for example, ethylene glycol isocrotonate, pentaerythritol isocrotonate, sorbitol tetraisocrotonate, and the like.

As the maleic acid esters, there are the examples of, for example, ethylene glycol dimaleate, triethylene glycol dimaleate, pentaerythritol dimaleate, sorbitol tetra malate, and the like.

As examples of other esters, it is possible to use aliphatic alcohol esters described in Japanese Examined Patent Application Publication No. S46-27926, Japanese Examined Patent Application Publication No. S51-47334, and Japanese Unexamined Patent Application Publication No. S57-196231, esters with an aromatic skeleton described in Japanese Unexamined Patent Application Publication No. S59-5240, Japanese Unexamined Patent Application Publication No. S59-5241, and Japanese Unexamined Patent Application Publication No. H2-226149, esters with an amino group described in Japanese Unexamined Patent Application Publication No. H1-165613, and the like.

As specific examples of a monomer of an amide of an unsaturated carboxylic acid and an aliphatic polyalcohol compound, there are the examples of, for example, methylenebis-acrylamide, methylenebis-methacrylamide, 1,6-hexamethylene bis-acrylamide, 1,6-hexamethylene bis-methacrylamide, diethylenetriamine tris acrylamide, xylylene bisacrylamide, xylylene bismethacrylamide, and the like.

As other preferable amide monomers, there are the examples of, for example, amide monomers with a cyclohexylene structure described in Japanese Examined Patent Application Publication No. S54-21726 and the like.

In addition, a urethane additional polymerization compound which is manufactured using an additional reaction between isocyanate and a hydroxyl group is also appropriate, and as specific examples of this, there are the examples of, for example, vinyl uretange compounds which includes two or more polymerizable vinyl groups in one molecule where a vinyl monomer, which contains a hydroxyl group shown as formula (1) below, is added to a polyisocyanate compound which has two or more isocyanate groups in one molecule which is described in Japanese Examined Patent Application Publication No. S48-41708 and the like.

$$CH_2=C(R^1)COOCH_2CH(R^2)OH \qquad (1)$$

(Here, $R^1$ and $R^2$ in formula (1) each individually represent H or CH3.)

In the present embodiment, it is possible to appropriately use a cation ring-opening polymerizable compound, which has one or more cyclic ether groups such as an epoxy group or a oxetane group in a molecule, as the ultraviolet ray curable resin (the polymerizable compound).

As the cation polymerization compound, there are the examples of, for example, curable compounds which include a ring-opening polymerizable group and the like, and among these, a curable compound which includes a hetero ring group is particularly preferable. As this curable compound, there are the examples of, for example, epoxy derivatives, oxetane derivatives, tetrahydrofuran derivatives, cyclic lactone derivatives, cyclic carbonate derivatives, cyclic imino ethers such as oxazoline derivatives, vinyl ethers, and the like, and among these, epoxy derivatives, oxetane derivatives, and vinyl ethers are preferable.

As examples of preferable epoxy derivatives, there are the examples of, for example, monofunctional glycidyl ethers, multifunctional glycidyl ethers, monofunctional cycloaliphatic epoxies, polyfunctional cycloaliphatic epoxies, and the like.

Specific examples of specific glycidyl ether compounds includes the examples of diglycidyl ethers (for example, ethylene glycol diglycidyl ethers, bisphenol A diglycidyl ethers, and the like), glycidyl ethers with three or more functional groups (for example, trimethylol ethane triglycidyl ethers, trimethylol propane triglycidyl ethers, glycerol triglycidyl ether, triglycidyl tris-hydroxyethyl isocyanurate, and the like), glycidyl ethers with four or more functional groups (for example, sorbitol tetra glycidyl ethers, pentaerythritol tetraglycyl ethers, polyglycidyl ethers of cresol novolac resins, polyglycidyl ethers of phenol novolac resins, and the like), alicyclic epoxy (for example, CELLOXIDE 2021P, CELLOXIDE 2081, EPOLEAD GT-301, and EPO-LEAD GT-401 (all manufactured by Daicel Corp.), EHPE (manufactured by Daicel Corp.), polycyclohexyl epoxy methyl ether of phenol novolac resin, oxetanes (for example, OX-SQ and PNOX-1009 (all manufactured by Toagosei Co., Ltd.), and the like.

It is possible to preferably use alicyclic epoxy derivatives as the polymerizable compound. An "alicyclic epoxy group" refer to partial structures where a double bond of a cycloalkane ring such as a cyclopentene group or a cyclohexene group is epoxied using an appropriate oxidizing agent such as hydrogen peroxide or peracid.

As the alicyclic epoxy derivative, polyfunctional cycloaliphatic epoxies, which have two or more of a cyclohexene oxide group or a cyclopentene oxide group in one molecule, are preferable. As specific examples of alicyclic epoxy compounds, there are the examples of, for example, 4-vinyl cyclohexene dioxide, (3,4-epoxy cyclohexyl) methyl 3,4-epoxy cyclohexyl carboxylate, di(3,4-epoxy cyclohexyl) adipate, di(3,4-epoxy cyclohexyl methyl) adipate, bis (2,3-epoxycyclopentyl) ether, di(2,3-epoxy-6-methylcyclo hexylmethyl) adipate, dicyclopentadiene dioxide, and the like.

It is possible to use a glycidyl compound, which has a typical epoxy group which does not have an alicyclic structure in the molecular, individually or together with the alicyclic epoxy derivative described above.

As a typical glycidyl compound, it is possible for there to be the examples of, for example, a glycidyl ether compound, a glycidyl ester compound, and the like, but use together with a glycidyl ether compound is preferable.

As specific examples of the glycidyl ether compound, there are the examples of, for example, aromatic glycidyl ether compounds such as 1,3-bis (2,3-epoxypropyloxy) benzene, a bisphenol A type epoxy resin, a bisphenol F-type epoxy resin, a phenol novolac epoxy resin, a cresol novolac epoxy resin, and a trisphenolmethane epoxy resin, aliphatic glycidyl ether compounds such as 1,4-butanediol glycidyl ether, glycerol triglycidyl ether, propylene glycol diglycidyl ether, and trimethylolpropane triglycidyl ether, and the like. As the glycidyl ether, it is possible for there to be the examples of, for example, a linoleate dimer glycidyl ether and the like.

As the polymerizable compound, it is possible to use a compound which has an oxetanyl group which is a cyclic ether with a four-membered ring (referred to below simply as "oxetanyl group"). The compound which includes an oxetanyl group is a compound with one or more oxetanyl groups in one molecule.

The content ratio of the bonding agent in the binding liquid 12 is preferable 80% or more by mass and is more preferably 85% or more by mass. Due to this, it is possible for the three dimensional mold object 10 which is obtained as a final product to have particularly superior mechanical strength.

Other Compounds

In addition, the binding liquid 12 may include compounds other than the compounds described above. As the other compounds, there are the examples of, for example, various types of coloring agents such as pigments and dyes, a dispersing agent, a surfactant, a polymerization initiator, a polymerization accelerator, a solvent, a penetration enhancing agent, a wetting agent (a moisturizing agent), a fixing agent, an antimold agent, a preserving agent, an antioxidizing agent, an ultraviolet absorbing agent, a chelating agent, a pH adjusting agent, a thickening agent, a filler, an aggregation inhibitor, a defoamer, and the like.

In particular, due to the binding liquid 12 including a coloring agent, it is possible to obtain the three dimensional mold object 10 which is colored with a color which corresponds to the color of the coloring agent.

In particular, due to a pigment being included as the color agent, it is possible for light proofing of the binding liquid 12 and the three dimensional mold object 10 to be favorable. It is possible for any inorganic pigment or organic pigment to be used as the pigment.

As the inorganic pigment, there are the examples of, for example, types of carbon black (C.I. Pigment Black 7) such as furnace black, lamp black, acetylene black, and channel black, iron oxide, titanium oxide, and the like, and it is possible to use one type or a combination of two or more types which are selected from these.

Among the inorganic pigments, titanium oxide is preferable for a preferable white color.

As the organic pigment, there are the examples of, for example, azo pigments such as an insoluble azo pigment, a condensed azo pigment, an azo lake pigment, and a chelate azo pigment, polycyclic pigments such as a phthalocyanine pigment, a perylene pigment, a perynone pigment, an anthraquinone pigment, a quinacridone pigment, a dioxane pigment, a thioindigo pigments, and a quinophthalone pigment, dye chelates (for example, basic dye chelates, acidic dye chelates, and the like), color lakes (basic dye lakes and acidic dye lakes), nitro pigments, nitroso pigments, aniline black, daylight fluorescent pigments, and the like, and it is possible to use one type or a combination of two or more types which are selected from these.

In further detail, as carbon black which is used as a black pigment, there are the examples of, for example, No. 2300, No. 900, MCF88, No. 33, No. 40, No. 45, No. 52, MA7, MA8, MA100, No. 2200B, and the like (all manufactured by Mitsubishi Chemical Corp.), Raven 5750, Raven 5250, Raven 5000, Raven 3500, Raven 1255, Raven 700, and the like (all manufactured by Carbon Columbia Inc.), Regal 400R, Regal 330R, Regal 660R, Mogul L, Monarch 700, Monarch 800, Monarch 880, Monarch 900, Monarch 1000, Monarch 1100, Monarch 1300, Monarch 1400, and the like (all manufactured by CABOT JAPAN K.K.), Color Black FW1, Color Black FW2, Color Black FW2V, Color Black FW18, Color Black FW200, Color Black S150, Color Black S160, Color Black S170, Printex 35, Printex U, Printex V, Printex 140U, Special Black 6, Special Black 5, Special Black 4A, Special Black 4, and the like (all manufactured by Degussa AG), and the like.

As white pigments, there are the examples of, for example, C.I. pigment white 6, 18, 21, and the like.

As yellow pigments, there are the examples of, for example, C.I. pigment yellow 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 167, 172, 180, and the like.

As magenta pigments, there are the examples of, for example, C.I. pigment red 1, 2, 3, 4, 5, 6, 7, 8, 9, 10, 11, 12, 14, 15, 16, 17, 18, 19, 21, 22, 23, 30, 31, 32, 37, 38, 40, 41, 42, 48 (Ca), 48 (Mn), 57 (Ca), 57:1, 88, 112, 114, 122, 123, 144, 146, 149, 150, 166, 168, 170, 171, 175, 176, 177, 178, 179, 184, 185, 187, 202, 209, 219, 224, 245, and C.I. pigment violet 19, 23, 32, 33, 36, 38, 43, 50, and the like.

As cyan pigments, there are the examples of, for example, C.I. pigment blue 1, 2, 3, 15, 15:1, 15:2, 15:3, 15:34, 15:4, 16, 18, 22, 25, 60, 65, 66, and C.I. vat blue 4, 60, and the like.

In addition, as pigments other than the pigments described above, there are the examples of, for example, C.I. pigment green 7, 10, C.I. pigment brown 3, 5, 25, 26, C.I. pigment orange 1, 2, 5, 7, 13, 14, 15, 16, 24, 34, 36, 38, 40, 43, 63, and the like.

In a case where the binding liquid 12 includes a pigment, the average particular diameter of the pigment is preferably 300 nm or less and is more preferably 50 nm or more and 250 nm or less. Due to this, it is possible to have particularly superior discharge stability of the binding liquid 12 and pigment dispersing stability within the binding liquid 12, and it is possible to form images with more superior image quality.

In addition, as dyes, there are the examples of, for example, acid dyes, direct dyes, reactive dyes, basic dyes, and the like, and it is possible to use one type or a combination of two or more types which are selected from these.

As specific examples of dyes, there are the examples of, for example, C.I. acid yellow 17, 23, 42, 44, 79, 142, C.I. acid red 52, 80, 82, 249, 254, 289, C.I. acid blue 9, 45, 249, C.I. acid black 1, 2, 24, 94, C.I. food black 1, 2, C.I. direct yellow 1, 12, 24, 33, 50, 55, 58, 86, 132, 142, 144, 173, C.I. direct red 1, 4, 9, 80, 81, 225, 227, C.I. direct blue 1, 2, 15, 71, 86, 87, 98, 165, 199, 202, C.I. direct black 19, 38, 51, 71, 154, 168, 171, 195, C.I. reactive red 14, 32, 55, 79, 249, C.I. reactive black 3, 4, 35, and the like.

In a case where the binding liquid 12 includes a coloring agent, the content ratio of the coloring agent in the binding liquid 12 is preferably 1% or more by mass and 20% or less by mass. Due to this, particularly superior concealment and color reproduction are obtained.

In particular, in a case where the binding liquid 12 includes titanium oxide as the coloring agent, the content ratio of titanium oxide in the binding liquid 12 is preferably 12% or more by mass and 18% or less by mass and is more preferably 14% or more by mass and 16% or less by mass. Due to this, particularly superior concealment is obtained.

In a case where the binding liquid 12 includes a pigment, more favorable dispersing of the pigment is possible if a dispersing agent is also included. The dispersing agent is not particularly limited and there are the examples of, for example, dispersing agents which are commonly used in preparing pigment dispersion liquids such as polymer dispersing agents. As specific examples of polymer dispersing agents, there are the examples of, for example, dispersing agents with a main component which is one or more type from polyoxyalkylene polyalkylene polyamines, vinyl polymer and copolymers, acrylic polymers and copolymers, polyesters, polyamides, polyimides, polyurethanes, amino polymers, silicon-containing polymers, sulfur-containing polymers, fluorine-containing polymers, and epoxy resins. As a commercially available product of a polymer dispersing agent, there are the examples of, for example, the AJISPER series from Ajinomoto Fine-Techno Co., Inc., the SOLSPERSE series (SOLSPERSE 36000 and the like) from Lubrizol Corp., the DISPERBYK series from BYK-Chemie GmbH, the DISPARLON series from Kusumoto Chemicals, Ltd., and the like.

It is possible for the three dimensional mold object 10 to have more favorable abrasion resistance if the binding liquid 12 includes a surfactant. The surfactant is not particularly limited and it is possible to use, for example, polyester-modified silicone, polyether-modified silicone, and the like as silicone-based surfactants, and among these, polyether-modified polydimethyl siloxane and polyester modified polydimethyl siloxane are preferable. As specific examples of the surfactant, there are the examples of, for example, BYK-347, BYK-348, BYK-UV3500, 3510, 3530, 3570 (all product names manufactured by BYK-Chemie GmbH), and the like.

In addition, the binding liquid 12 may include a solvent. Due to this, it is possible for adjusting of the viscosity of the binding liquid 12 to be appropriately performed and it is possible for discharge stability of the binding liquid 12 using an ink jet system to be particularly superior even when the binding liquid 12 includes components with high viscosity.

As the solvent, there are the examples of, for example, (poly)alkylene glycol monoalkyl ethers such as ethylene glycol monomethyl ether, ethylene glycol monoethyl ether, propylene glycol monomethyl ether, and propylene glycol mono ethyl ether, acetic acid esters such as ethyl acetate, n-propyl acetate, iso-propyl acetate, n-butyl acetate, and iso-butyl acetate, aromatic hydrocarbons such as benzene, toluene, and xylene, ketones such as methyl ethyl ketone, acetone, methyl isobutyl ketone, ethyl-n-butyl ketone, diisopropyl ketone, and acetylacetone, alcohols such as ethanol, propanol, and butanol, and it is possible to use one type or a combination of two or more types which are selected from these.

In addition, the viscosity of the binding liquid 12 is preferably 10 mPa·s or more and 30 mPa·s or less and is more preferably 15 mPa·s or more and 25 mPa·s or less. Due to this, it is possible for the binding liquid 12 to have particularly superior discharge stability using an ink jet system. Here, viscosity in the present specifications is a value which is measured at 25° C. using an E type viscometer (VISCONIC ELD manufactured by Tokyo Keiki Inc.).

In addition, a plurality of types of the binding liquid 12 may be used in manufacturing the three dimensional mold object 10.

For example, the binding liquid 12 which includes a coloring agent (a color ink) and the binding liquid 12 which does not include a coloring agent (a clear ink) may be used. Due to this, for example, the binding liquid 12 which includes a coloring agent may be used as the binding liquid 12 which is applied to a region which affects the color tone in terms of the outer appearance of the three dimensional mold object 10 and the binding liquid 12 which does not include a coloring agent may be used as the binding liquid 12 which is applied to a region which does not affect the color tone in terms of the outer appearance of the three dimensional mold object 10. In addition, a plurality of types of the binding liquid 12 may be used together such that a region (a coating layer), which is formed using the binding liquid 12 which does not include a coloring agent, is provided on the outer surface of a region, which is formed using the binding liquid 12 which includes a coloring agent, in the three dimensional mold object 10 which is obtained as a final product.

In addition, for example, a plurality of types of the binding liquid 12, which include coloring agents with different compositions, may be used. Due to this, it is possible to have a wide color reproduction region which is able to be expressed using combinations of the binding liquids 12.

In a case where a plurality of types of the binding liquids 12 are used, it is preferable that at least the binding liquid 12 with a cyan color, the binding liquid 12 with a magenta color, and the binding liquid 12 with a yellow color be used. Due to this, it is possible to have a wider color reproduction region which is able to be expressed using combinations of the binding liquids 12.

In addition, the following effects are obtained when, for example, the binding liquid 12 with a white color is used together with the binding liquids 12 with other colors. That is, it is possible for the three dimensional mold object 10 which is obtained as a final product to have a first region where the binding liquid 12 with a white color is applied and a region (a second region) where the binding liquids 12 with the colors other than white are applied to overlap with the first region and be provided more to the outer surface side than the first region. Due to this, it is possible for the first region where the binding liquid 12 with a white color is applied to exhibit concealment and it is possible for further increase color intensity of the three dimensional mold object 10.

Composition (Three Dimensional Molding Composition)

Next, the composition (the three dimensional molding composition) 11 which is used in manufacturing of the three dimensional mold object of the present embodiment will be described in detail next.

Figure 8:
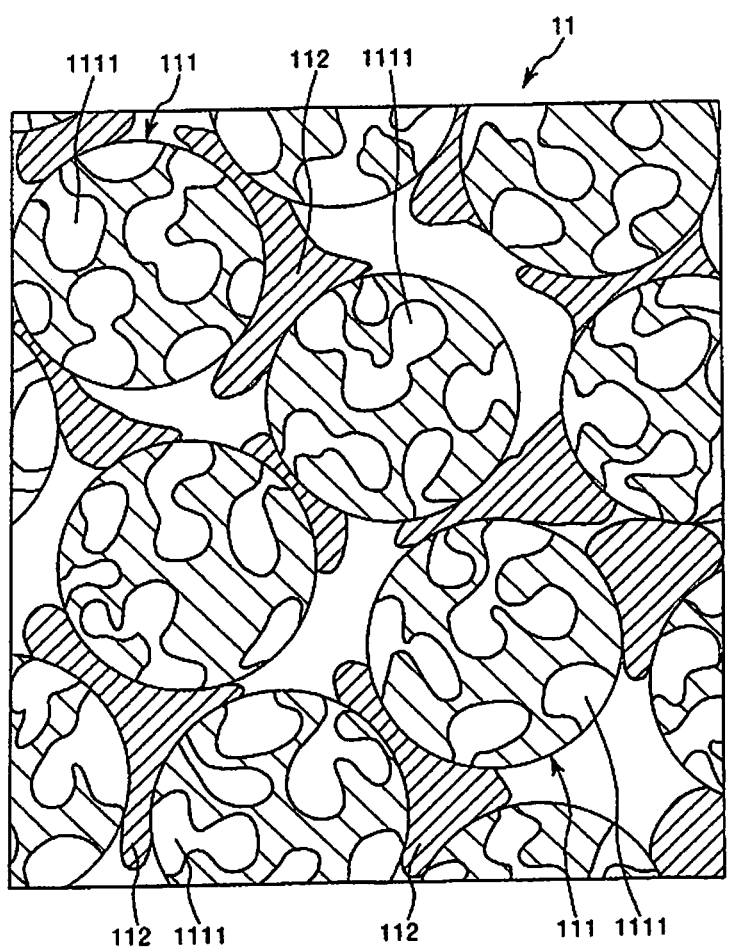
FIG. 8 is a cross sectional diagram schematically illustrating a state in a layer (a three dimensional mold object) immediately before a composition applying process.
Figure 9:
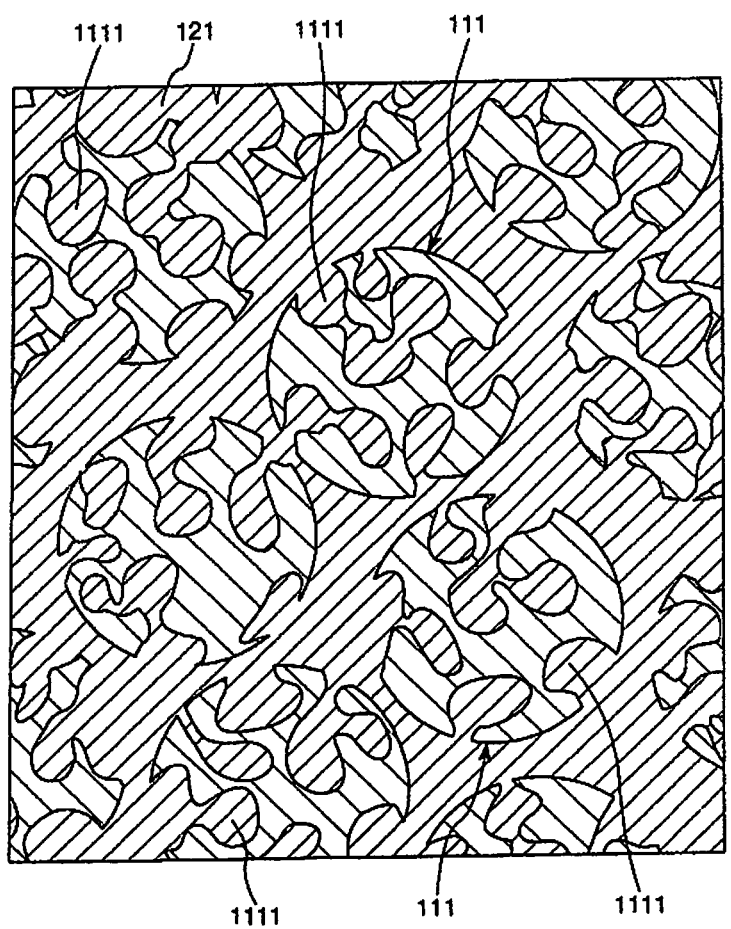
FIG. 9 is a cross sectional diagram schematically illustrating a state where particles are bonded together using a binding agent which is hydrophobic.

FIG. 8 is a cross sectional diagram schematically illustrating a state in the layer (the three dimensional mold object) immediately before a composition applying process. FIG. 9 is a cross sectional diagram schematically illustrating a state where the particles are bonded together using the binding agent which is hydrophobic.

The composition (the three dimensional molding composition) 11 includes at least a three dimensional molding powder which includes a plurality of the particles 111.

Three Dimensional Molding Powder (Particles 111)

It is preferable that the particles 111 which configure the three dimensional molding powder be porous and be subject to a hydrophobic processing. Due to this configuration, in a case where the binding liquid 12 includes the bonding agent 121 which is hydrophobic, it is possible for the bonding agent 121 which is hydrophobic to appropriately penetrate inside the porous holes 1111 and for an anchor effect to be exhibited when manufacturing the three dimensional mold object 10, and as a result, it is possible to have a superior bonding force in the bonding together of the particles 111 (a bonding force using the bonding agent 121) and it is possible to appropriately manufacture the three dimensional mold object 10 with superior mechanical strength as a result (refer to FIG. 9). In addition, it is possible for the three dimensional molding powder to be appropriately reused. To describe in more detail, since a water soluble resin 112 which will be described later is prevented from entering into the porous holes 1111 if the hydrophobic processing is carried out on the particles 111 which configure the three dimensional mold object, it is possible for the particles 111 in a region where the binding liquid 12 is not applied to be recovered with a high level of purity where the content of impurities is low due to being washed using water or the like in manufacturing of the three dimensional mold object 10. For this reason, it is possible to obtain the three dimensional molding composition where the desired composition is reliably controlled by again mixing the three dimensional molding powder which is recovered and the water soluble resin 112 in desired proportions. In addition, it is possible to effectively prevent unintentional wet spreading of the binding liquid 12 due to the bonding agent 121 which configures the binding liquid 12 entered into the porous holes 1111 of the particles 111. As a result, it is possible for the dimensional precision of the three dimensional mold object 10 which is obtained as a final result to be even higher.

As the configuring material of the particles 111 which configure the three dimensional molding powder (particles on which the hydrophobic processing is carried out), there are the examples of, for example, inorganic material, organic materials, or a composite of these.

As the inorganic materials which configure the particles 111, there are the examples of, for example, various types of metals, metal compounds, and the like. As the metal compounds, there are the examples of, for example, various types of metal oxides such as silica, alumina, titanium oxide, zinc oxide, zirconium oxide, tin oxide, magnesium oxide, and potassium titanate, various types of metal hydroxides such as magnesium hydroxide, aluminum hydroxide, and calcium hydroxide, various types of metal nitride such as silicon nitride, titanium nitride, and aluminum nitride, various types of metal carbides such as silicon carbide and titanium carbide, various types of metal sulfides such as zinc sulfide, various types of metal carbonates such as calcium carbonate and magnesium carbonate, various types of metal sulfates such as calcium sulfate and magnesium sulfate, various types of metal silicates such as calcium silicate and magnesium silicate, various types of metal phosphates such as calcium phosphate, various types of metal borates such as aluminum borate and magnesium borate, a composite of these, or the like.

As the organic materials which configure the particles 111, there are the examples of, for example, synthetic resins, natural polymers, and the like, and in more detail, there are the examples of polyethylene resin, polypropylene, polyethylene oxide, polypropylene oxide, polyethylene imine, polystyrene, polyurethane, polyuria, polyester, silicone resin, acrylic silicone resin, polymers with a (meth) acrylate ester such as polymethyl methacrylate as a configuring monomer, crosspolymers with a (meth) acrylate ester such as a methyl methacrylate cross polymer as a configuring monomer (ethylene acrylate copolymer resin), polyamide resins such as nylon 12, nylon 6, or nylon copolymers, polyimide, carboxymethyl cellulose, gelatin, starch, chitin, chitosan, and the like.

Among these, the particles 111 are preferably configured using inorganic materials, are more preferably configured using a metal oxide, and are even more preferably configured using silica. Due to this, it is possible for the three dimensional mold object 10 to have particularly superior characteristics such as mechanical strength and durability. In addition, in particular, the effects described above are more remarkably exhibited if the particles 111 are configured using silica. In addition, since silica has superior fluidity, it is effective in forming the layers 1 with even higher uniformity in thickness and it is effective having particularly superior productivity and dimensional precision of the three dimension mold object 10.

It is sufficient if the hydrophobic processing, which is carried out on the particles 111 which configure the three dimensional molding powder, is any process which increases the hydrophobicity of the particles 111, but a process which introduces a hydrocarbon group is preferable. Due to this, it is possible for the hydrophobicity of the particles 111 to be higher. In addition, it is possible for the uniformity of the extent of the hydrophobic processing to be higher for each of the particles 111 and each portion on the surface of the particles 111 (including the surfaces inside of the porous holes 1111) in an easy and reliable manner.

A silane compound which includes a silyl group is preferable as the compound which is used in the hydrophobic processing. As specific examples of the compound which is able to be used in the hydrophobic processing, there are the examples of, for example, hexamethyl disilazane, dimethyl dimethoxy silane, diethyl diethoxy silane, 1-propenyl methyl dichloro silane, propyl dimethyl chloro silane, propyl methyl dichloro silane, propyl trichloro silane, propyl triethoxy silane, propyl trimethoxy silane, styrylethyl trimethoxy silane, tetradecyl trichloro silane, 3-thiocyanate propyl triethoxy silane, p-tolyl dimethyl chloro silane, p-tolyl methyl dichloro silane, p-tolyl trichloro silane, p-tolyl trimethoxy silane, p-tolyl triethoxy silane, di-n-propyl di-n-propoxy silane, diisopropyl diisopropoxy silane, di-n-butyl di-n-propoyl silane, di-sec-butyl di-sec-butyloxy silane, di-t-butyl di-t-butyloxy silane, octadecyl trichloro silane, octadecyl methyl diethoxy silane, octadecyl triethoxy silane, octadecyl trimethoxy silane, octadecyl dimethyl chloro silane, octadecyl methyl dichloro silane, octadecyl methoxy dichloro silane, 7-octenyl dimethyl chloro silane, 7-octenyl trichloro silane, 7-octenyl trimethoxy silane, octylmethyl dichloro silane, octyldimethyl chloro silane, octyl trichloro silane, 10-undecenyl dimethyl chloro silane, undecyl trichloro silane, vinyldimethyl chloro silane, methyl octadecyl dimethoxy silane, methyl dodecyl diethoxy silane, methyl octadecyl silane, methyl octadecyl diethoxy silane, n-octyl methyl dimethoxy silane, n-octyl methyl diethoxy silane, triacontyl dimethyl chloro silane, triacontyl trichloro silane, methyl trimethoxy silane, methyl triethoxy silane, methyl tri-n-propoxy silane, methyl isopropoxy silane, methyl-n-butyloxy silane, methyl tri-sec-butyloxy silane, methyl tri-t-butyloxy silane, ethyl trimethoxy silane, ethyl triethoxy silane, ethyl tri-n-propoxy silane, ethyl isopropoxy silane, ethyl-n-butyloxy silane, ethyl tri-sec-butyloxy silane, ethyl tri-t-butyloxy silane, n-propyl trimethoxy silane, isobutyl trimethoxy silane, n-hexyl trimethoxy silane, hexadecyl trimethoxy silane, n-octyl trimethoxy silane, n-dodecyl trimethoxy silane, n-octadecyl trimethoxy silane, n-propyl triethoxy silane, isobutyl triethoxy silane, n-hexyl triethoxy silane, hexadecyl triethoxy silane, n-octyl triethoxy silane, n-dodecyl trimethoxy silane, n-octadecyl triethoxy silane, 2-[2-(trichlorosilyl)ethyl] pyridine, 4-[2-(trichlorosilyl)ethyl] pyridine, diphenyl dimethoxy silane, diphenyl diethoxy silane, 1,3(trichlorosilyl methyl) heptacosane, dibenzyl dimethoxy silane, dibenzyl diethoxy silane, phenyl trimethoxy silane, phenyl methyl dimethoxy silane, phenyl dimethyl methoxy silane, phenyl dimethoxy silane, phenyl diethoxy silane, phenyl methyl diethoxy silane, phenyl dimethyl ethoxy silane, benzyl triethoxy silane, benzyl trimethoxy silane, benzyl methyl dimethoxy silane, benzyl dimethyl methoxy silane, benzyl dimethoxy silane, benzyl diethoxy silane, benzyl methyl diethoxy silane, benzyl dimethyl ethoxy silane, benzyl triethoxy silane, dibenzyl dimethoxy silane, dibenzyl ethoxy silane, 3-acetoxy propyl trimethoxy silane, 3-acryloxypropyl trimethoxy silane, allyl trimethoxy silane, allyl triethoxy silane, 4-aminobutyl triethoxy silane, (aminoethyl aminomethyl) phenethyl trimethoxy silane, N-(2-aminoethyl)-3-aminopropyl methyl dimethoxy silane, N-(2-aminoethyl)-3-aminopropyl trimethoxy silane, 6-(aminohexyl aminopropyl) trimethoxy silane, p-aminophenyl trimethoxy silane, p-aminophenyl ethoxy silane, m-aminophenyl trimethoxy silane, m-aminophenyl methoxy silane, 3-aminopropyl trimethoxy silane, 3-aminopropyl triethoxy silane, ω-amino undecyl trimethoxy silane, amyl triethoxy silane, benzoxa silepin dimethyl ester, 5-(bicycle heptenyl) triethoxy silane, bis(2-hydroxyethyl)-3-aminopropyl triethoxy silane, 8-bromooctyl trimethoxy silane, bromophenyl trimethoxy silane, 3-bromopropyl trimethoxy silane, n-butyl trimethoxy silane, 2-chloromethyl triethoxy silane, chloromethyl methyl diethoxy silane, chloromethyl methyl diisopropoxy silane, p-(chloromethyl) phenyl trimethoxy silane, chloromethyl triethoxy silane, chlorophenyl triethoxy silane, 3-chloropropyl methyl dimethoxy silane, 3-chloropropyl triethoxy silane, 3-chloropropyl trimethoxy silane, 2-(4-chlorosulfonyl phenyl) ethyl trimethoxy silane, 2-cyanoethyl triethoxy silane, 2-cyanoethyl trimethoxy silane, cyanomethyl phenethyl trimethoxy silane, 3-cyanopropyl triethoxy silane, 2-(3-cyclohexenyl)ethyl trimethoxy silane, 2-(3-cyclohexenyl)ethyl triethoxy silane, 3-cyclohexenyl trichloro silane, 2-(3-cyclohexenyl)ethyl trichloro silane, 2-(3-cyclohexenyl) ethyl chloro dimethyl silane, 2-(3-cyclohexenyl)ethyl methyl dichloro silane, cyclohexyl dimethyl chloro silane, cyclohexylethyl dimethoxy silane, cyclohexyl methyl dichloro silane, cyclohexyl methyl dimethoxy silane, (cyclohexyl methyl) trichloro silane, cyclohexyl trichloro silane, cyclohexyl trimethoxy silane, cyclooctyl trichloro silane, (4-cyclooctenyl) trichloro silane, cyclopentyl trichloro silane, cyclopentyl trimethoxy silane, 1,1-diethoxy-1-silacyclo pentadiene-3-ene, 3-(2,4-dinitro phenyl)propyl triethoxy silane, (dimethyl chlorosilyl) methyl-7,7-dimethyl norpinane, (cyclohexyl aminomethyl) methyl diethoxy silane, (3-cyclopenta dienylpropyl) triethoxy silane, N,N-diethyl-3-aminopropyl trimethoxy silane, 2-(3,4-epoxy cyclohexyl) ethyl trimethoxy silane, 2-(3,4-epoxy cyclohexyl) ethyl triethoxy silane, (furfuryloxy methyl) triethoxy silane, 2-hydroxy-4-(3-triethoxy propoxy) diphenyl ketone, 3-(p-methoxy phenyl) propyl methyl dichloro silane, 3-(p-methoxy phenyl) propyl trichloro silane, p-(methyl phenethyl) methyl dichloro silane, p-(methyl phenethyl) trichloro silane, p-(methyl phenethyl) dimethyl chloro silane, 3 morpholinopropyl trimethoxy silane, (3-glycidoxy propyl) methyl diethoxy silane, 3-glycidoxy propyl trimethoxy silane, 1,2,3,4,7,7-hexachloro-6-methyl diethoxy silyl-2-norbornene, 1,2,3,4,7,7-hexachloro-6-triethoxy silyl-2-norbornene, 3-iodopropyl trimethoxy silane, 3-isocyanato propyl triethoxy silane, (mercapto methyl) methyl diethoxy silane, 3-mercapto propyl methyl dimethoxy silane, 3-mercaptopropyl dimethoxy silane, 3-mercaptopropyl triethoxy silane, 3-methacryloxypropyl methyldiethoxy silane, 3-methacryloxypropyl trimethoxy silane, methyl{2-(3-trimethoxysilyl propylamino) ethylamino}-3-propionate, 7-octenyloxy trimethoxy silane, R—N-α-phenethyl-N'-triethoxysilyl propyl urea, S—N-α-phenethyl-N'-triethoxysilyl propyl urea, phenethyl trimethoxy silane, phenethyl methyl dimethoxy silane, phenethyl dimethyl silane, phenethyl dimethoxy silane, phenethyl diethoxy silane, phenethyl methyldiethoxy silane, phenethyl dimethylethoxy silane, phenethyl trimethoxy silane, (3-phenylpropyl) dimethyl chloro silane, (3-phenylpropyl) methyl dichloro silane, N-phenyl aminopropyl trimethoxy silane, N-(triethoxysilyl propyl) dansylamide, N-(3-triethoxysilyl propyl)-4,5-dihydroimidazole, 2-(triethoxysilyl ethyl)-5-(chloroacetoxy) bicycloheptane, (S)—N-triethoxysilyl propyl-O-mentho carbamate, 3-(triethoxysilyl propyl)-p-nitrobenzamide, 3-(triethoxysilyl) propyl succinic anhydride, N-[5-(trimethoxy silyl)-2-aza-1-oxo-pentyl] caprolactam, 2-(trimethoxy silylethyl) pyridine, N-(trimethoxy silyl) benzyl-N,N,N-trimethyl ammonium chloride, phenyl vinyl diethoxy silane, 3-thiocyanate propyl triethoxy silane, (tridecafluoro 1,1,2,2-tetra-hydro-octyl) triethoxy silane, N-{3-(triethoxy silyl) propyl} phthalamide acid, (3,3,3-trifluoropropyl) methyl dimethoxy silane, (3,3,3-trifluoropropyl) trimethoxy silane, 1-trimethoxy silyl-2-(chloromethyl) phenyl ethane, 2-(trimethoxy silyl) ethyl phenyl sulfonyl azide, β-trimethoxy silyl ethyl-2-pyridine, trimethoxy silyl propyl diethylene triamine, N-(3-trimethoxy silyl propyl) pyrrole, N-trimethoxy silylpropyl-N,N,N-tributyl ammonium bromide, N-trimethoxy silylpropyl-N,N,N-tributyl ammonium chloride, N-trimethoxy silylpropyl-N,N,N-trimethyl ammonium chloride, vinylmethyl diethoxy silane, vinyl triethoxy silane, vinyl trimethoxy silane, vinylmethyl dimethoxy silane, vinyl dimethyl methoxy silane, vinyl dimethyl ethoxy silane, vinylmethyl dichloro silane, vinylphenyl dichloro silane, vinylphenyl diethoxy silane, vinylphenyl dimethyl silane, vinylphenyl methyl chloro silane, triphenoxy vinyl silane, tris-t-butoxy silane, adamantylethyl trichloro silane, allyl phenyl trichloro silane, (aminoethyl aminomethyl) phenethyl trimethoxy silane, 3-aminophenoxy dimethyl vinyl silane, phenyl trichloro silane, phenyl dimethyl chloro silane, phenylmethyl dichloro silane, benzyl trichloro silane, benzyl dimethyl chloro silane, benzyl methyl dichloro silane, phenethyl diisopropyl chloro silane, phenethyl trichloro silane, phenethyl dimethyl chloro silane, phenethyl methyl dichloro silane, 5-(bicycloheptenyl) trichloro silane, 5-(bicycloheptenyl) triethoxy silane, 2-(bicycloheptyl) dimethyl chloro silane, 2-(bicycloheptyl) trichloro silane, 1,4-bis (trimethoxy silyl ethyl) benzene, bromophenyl trichloro silane, 3-phenoxypropyl dimethyl chloro silane, 3-phenoxypropyl trichloro silane, t-butyl phenyl chloro silane, t-butyl phenyl methoxy silane, t-butyl phenyl dichloro silane, p-(t-butyl) phenethyl dimethyl chloro silane, p-(t-butyl) phenethyl trichloro silane, 1,3-(chlorodimethyl silyl methyl) heptacosane, ((chloromethyl) phenyl ethyl) dimethyl chloro silane, ((chloromethyl) phenyl ethyl) methyl dichloro silane, ((chloromethyl) phenylethyl) trichloro silane, ((chloromethyl) phenylethyl) trimethoxy silane, chlorophenyl trichloro silane, 2-cyanoethyl trichloro silane, 2-cyanoethyl methyl dichloro silane, 3-cyanopropyl methyl diethoxy silane, 3-cyanopropyl methyl dichloro silane, 3-cyanopropyl methyl dichloro silane, 3-cyanopropyl dimethylethoxy silane, 3-cyanopropyl methyl dichloro silane, 3-cyanopropyl trichloro silane, fluorinated alkyl silane, and the like, and it is possible to use one type or a combination of two or more types which are selected from these.

Among these, it is preferable that hexamethyl disilazane is used in the hydrophobic processing. Due to this, it is possible for the particles 111 to have higher hydrophobicity. In addition, it is possible for the uniformity of the extent of the hydrophobic processing to be higher for each of the particles 111 and each portion on the surface of the particles 111 (including the surfaces inside of the porous holes 1111) in an easy and reliable manner.

In a case where the hydrophobic processing is performed using a silane compound in a liquid phase, it is possible for a desired reaction to appropriately progress and it is possible to form a silane compound chemical absorption film by immersing the particles 111, on which the hydrophobic processing is to be carried out, in a liquid which includes a silane compound.

In addition, in a case where the hydrophobic processing is performed using a silane compound in a gas phase, it is possible for a desired reaction to appropriately progress and it is possible to form a silane compound chemical absorption film by exposing the particles 111, on which the hydrophobic processing is to be carried out, to the vapors of a silane compound.

The average particle diameter of the particles 111 which configure the three dimensional molding powder is not particularly limited but is preferably 1 μm or more and 25 μm or less and is more preferable 1 μm or more and 15 μm or less. Due to this, it is possible for the three dimensional mold object 10 to have particularly superior mechanical strength, for unintentional irregularities and the like to be more effectively prevented from being generated in the three dimensional mold object 10 which is manufactured, and for the three dimensional mold object 10 to have particularly superior dimensional precision. In addition, it is possible for the three dimensional molding powder to have particularly superior fluidity and fluidity of the composition (the three dimensional molding composition) 11 which includes the three dimensional molding powder and it is possible for the three dimensional mold object 10 to have particularly superior productivity.

The maximum diameter of the particles 111 which configure the three dimensional molding powder is preferably 3 μm or more and 40 μm or less and is more preferably 5 μm or more and 30 μm or less. Due to this, it is possible for the three dimensional mold object 10 to have particularly superior mechanical strength, for unintentional irregularities and the like to be more effectively prevented from being generated in the three dimensional mold object 10 which is manufactured, and for the three dimensional mold object 10 to have particularly superior dimensional precision. In addition, it is possible for the three dimensional molding powder to have particularly superior fluidity and fluidity of the composition (the three dimensional molding composition) 11 which includes the three dimensional molding powder and it is possible for the three dimensional mold object 10 to have particularly superior productivity.

The porosity of the particles 111 which configure the three dimensional molding powder is preferably 50% or more and is more preferably 55% or more and 90% or less. Due to this, it is possible for there to be sufficiently spaces (the porous holes 1111) into which the bonding agent enters and for the particles 111 to have particularly superior mechanical strength, and as a result, it is possible for the three dimensional mold object 10 to have particularly superior productivity due to the bonding agent 121 penetrating into the porous holes 1111. Here, the porosity of the particles in the present embodiment refers to the proportion of the holes which are inside of the particles (in terms of volume) with regard to the apparent volume of the particles and is a value which is represented by $\{(\rho_0-\rho)/\rho_0\}\times 100$ when the density of the particles is $\rho$ (g/cm$^3$) and the true density of the configuring material of the particles is $\rho_0$ (g/cm$^3$).

The average hole diameter of the particles 111 (the diameter of the pores) is preferable 10 nm or more and is more preferably 50 nm or more and 300 nm or less. Due to this, it is possible for the three dimensional mold object 10 which is obtained as a final product to have particularly superior mechanical strength. In addition, in a case where the binding liquid 12 which includes a pigment (a color ink) is used in manufacturing the three dimensional mold object 10, it is possible for the pigment to be appropriately held in the porous holes 1111 of the particles 111. For this reason, it is possible to prevent unintentional dispersing of the pigment and it is possible to more reliably form high precision images.

The particles 111 which configure the three dimensional molding powder may have any shape but preferably have spherical shapes. Due to this, it is possible to have particularly superior fluidity of the three dimensional molding powder and fluidity of the composition (the three dimensional molding composition) 11 which includes the three dimensional molding powder and it is possible for the three dimensional mold object 10 to have particularly superior productivity, and it is possible for unintentional irregularities and the like to be more effectively prevented from being generated in the three dimensional mold object 10 which is manufactured and for the three dimensional mold object 10 to have particularly superior dimensional precision.

The void ratio of the three dimensional molding powder is preferably 70% or more and 98% or less and is more preferably 75% or more and 97.7% or less. Due to this, it is possible for the three dimensional mold object 10 to have particularly superior mechanical strength. In addition, it is possible to have particularly superior fluidity of the three dimensional molding powder and fluidity of the composition (the three dimensional molding composition) 11 which includes the three dimensional molding powder and it is possible for the three dimensional mold object 10 to have particularly superior productivity, and it is possible to more effectively prevent unintentional irregularities and the like being generated in the three dimensional mold object 10 which is manufactured and for the three dimensional mold object 10 to have particularly superior dimensional precision. Here, in a case where the inside of a vessel with a predetermined capacity (for example, 100 mL) is filled with the three dimensional molding powder, the void ratio of the three dimensional molding powder in the present embodiment refers to the ratio of the sum of the volume of the porous holes in all of the particles which configure the three dimensional molding powder and the volume of the voids which are between the particles with regard to the capacity of the vessel and is a value which is represented by $\{(P_0-P)/P_0\}\times 100$ when the bulk density of the three dimensional molding powder is P (g/cm$^3$) and the true density of the configuring materials of the three dimensional molding powder is $P_0$ (g/cm$^3$).

The content ratio of the three dimensional molding powder in the composition (the three dimensional molding composition) 11 is preferably 10% or more by mass and 90% or less by mass and is more preferably 15% or more by mass and 65% or less by mass. Due to this, it is possible for the fluidity of the composition (the three dimensional molding composition) 11 to be sufficiently superior and it is possible for the three dimensional mold object 10 which is obtained as a final product to have particularly superior mechanical strength.

Water Soluble Resin

The composition 11 may include the water soluble resin 112 along with a plurality of the particles 111. Due to the water soluble resin 112 being included, the particles are bonded (temporary fixed) together in portions of the layer 1 where the binding liquid 12 is not applied (refer to FIG. 8) and it is possible to effectively prevent unintentional scattering and the like of the particles 111. Due to this, it is possible to achieve an improvement in the safety of an operator and dimensional precision of the three dimensional mold object 10 which is manufactured. Even in a case where the water soluble resin 112 is included, the water soluble resin 112 is effectively prevented from entering into the porous holes 1111 of the particles 111 in a case where the hydrophobic processing is carried out on the particles 111. For this reason, it is possible to reliably exhibit the function of the water soluble resin 112 which is to temporarily fix together the particles 111 and to reliably prevent the problem, where it is not possible to secure the space into which the bonding agent 121 enters, being generated due to the water soluble resin 112 previously entering into the porous holes 1111 of the particles 111.

It is sufficient if at least a portion of the water soluble resin 112 is soluble in water and the solubility with regard to water at 25° C. (the amount which is able to be dissolved in 100 g of water) is preferably, for example, 5 (g/100 g of water) or more and is more preferably 10 (g/100 g of water) or more.

As the water soluble resin 112, there are the examples of, for example, synthetic polymers such as random copolymers of polyvinyl alcohol (PVA), polyvinyl pyrrolidone (PVP), polycaprolactam diol, sodium polyacrylate, polyacrylamide, modified polyamide, polyethylene imine, polyethylene oxide, ethylene oxide, and propylene oxide, natural polymers such as corn starch, mannan, pectin, agar, alginic acid, dextran, glue, and gelatin, semi-synthetic polymers such as carboxymethyl cellulose, hydroxyethyl cellulose, oxidized starch, and modified starches, and the like, and it is possible to use one type or a combination of two or more types which are selected from these.

As details examples of water soluble resin products, there are the examples of, for example, methyl cellulose (METOLOSE SM-15 manufactured by Shin-Etsu Chemical Co., Ltd.), hydroxyethyl cellulose (AL-15 manufactured by Fuji Chemical Co., Ltd.), hydroxypropyl cellulose (HPC-M manufactured by Nippon Soda Co., Ltd.), carboxymethyl cellulose (CMC-30 manufactured by Nichirin Chemical Co., Ltd.), starch phosphate ester sodium (I) (HOSTER 5100 manufactured by Matsutani Chemical Industry Co., Ltd.), polyvinylpyrrolidone (PVP K-90 manufactured by Tokyo Chemical Co., Ltd.), methyl vinyl ether/maleic anhydride copolymer (GANTREZ AN-139 manufactured by GAF Chemical Corp.), polyacrylamide (manufactured by Wako Pure Chemical Industries Ltd.), modified polyamide (modified nylon) (AQ nylon manufactured by Toray Industries Inc.), polyethylene oxide (PEO-1 manufactured by Seitetsu Kagaku Kogyo K.K. and ALKOX manufactured by Meisei Chemical Works, Ltd.), random copolymer of ethylene oxide and propylene oxide (ALKOX EP manufactured by Meisei Chemical Works, Ltd.), sodium polyacrylate (manufactured by Wako Pure Chemical Industries Ltd.), carboxy vinyl polymer/cross-linked water soluble acrylic resin (AQUPEC manufactured by Sumitomo Seika Chemicals Co., Ltd.), and the like.

Among these, it is possible for the three dimensional mold object 10 to have particularly superior mechanical strength in a case where the water soluble resin 112 is a polyvinyl alcohol. In addition, it is possible to more appropriately control the properties of the water soluble resin 112 (for example, solubility in water, water resistance, and the like) and the properties of the composition 11 (for example, viscosity, force for fixing of the particles 111, wettability, and the like) by adjusting the extent of saponification and polymerization. For this reason, it is possible to more appropriately correspond to manufacturing of various types of the three dimensional mold object 10. In addition, polyvinyl alcohols are cheaper and have a more stable supply among the various types of water soluble resins. For this reason, it is possible to perform stable manufacturing of the three dimensional mold object 10 while suppressing production costs.

In a case where the water soluble resin 112 includes polyvinyl alcohol, it is preferable that saponification of the polyvinyl alcohol be 85 or more and 90 or less. Due to this, it is possible to suppress a reduction in solubility of the polyvinyl alcohol with regard to water. For this reason, it is possible to more effectively suppress a reduction in adhesiveness between the layers 1 which are adjacent in a case where the composition 11 includes water.

In a case where the water soluble resin 112 includes polyvinyl alcohol, it is preferable that polymerization of the polyvinyl alcohol be 300 or more and 1000 or less. Due to this, it is possible to have particularly superior mechanical strength in each of the layers 1 and adhesiveness between the layers 1 which are adjacent in a case where the composition 11 includes water.

In addition, the following effects are obtained in a case where the water soluble resin 112 is a polyvinyl pyrrolidone (PVP). That is, since polyvinyl pyrrolidone has superior adhesiveness with regard to various materials such as glass, metals, and plastics, it is possible for the layer 1 where the binding liquid 12 is not applied to have particularly superior stability in the strength and shape of portions and for the three dimensional mold object 10 which is obtained as a final product to have particularly superior dimensional precision. In addition, since polyvinyl pyrrolidone exhibits high solubility with regard to various types of organic solvents, it is possible for the composition 11 to have particularly superior fluidity in a case where the composition 11 includes an organic solvent, it is possible to appropriately form the layer 1 where unintentional variation in the thickness is more effectively prevented, and it is possible for the three dimensional mold object 10 which is obtained as a final product to have particularly superior dimensional precision. In addition, since polyvinyl pyrrolidone exhibits high solubility with regard to water, it is possible to easily and reliably remove the particles 111 which are not bonded using the bonding agent 121 out of the particles 111 which configure each of the layers 1 in the unbonded particles removing process (after manufacturing is complete). In addition, since polyvinyl pyrrolidone has appropriate affinity with the three dimensional molding powder, wettability with regard to the surface of the particles 111 is comparatively high while, on the other hand, it is sufficiently difficult for entering into the porous holes 1111 to occur as described above. For this reason, it is possible to more effectively exhibit the function of temporary fixing as described above. In addition, since polyvinyl pyrrolidone has superior affinity with regard to various types of coloring agents, it is possible to effectively prevent unintentional spreading of the coloring agent in a case where the binding liquid 12 which includes a coloring agent is used in the binding liquid applying process. In addition, since polyvinyl pyrrolidone has an anti-static function, it is possible to effectively prevent scattering of the particles in a case where the particles which are not in a paste are used as the composition 11 in the layer forming process. In addition, if the composition 11 in a paste form includes polyvinyl pyrrolidone in a case where the composition 11 is used as a paste in the layer forming process, it is possible to effectively prevent foam being mixed into the composition 11 and it is possible to more effectively prevent defects due to the foam being mixed in being generated in the layer forming process.

In a case where the water soluble resin 112 includes polyvinyl pyrrolidone, the weight average molecular weight of the polyvinyl pyrrolidone is preferably 10000 or more and 1700000 or less and is preferably 30000 or more and 1500000 or less. Due to this, it is possible to more effectively exhibit the function described above.

In addition, in a case where the water soluble resin 112 includes polycaprolactam diol, it is possible for the composition 11 to be in appropriate pellet shapes, it is possible to more effectively prevent unintentional scattering of the particles 111 and the like, and it is possible to improve the handling (ease of handling) of the composition 11 and achieve an improvement in safety of the operator and dimensional precision of the three dimensional mold object 10 which is manufactured, and it is possible to suppress energy costs which are necessary in the production of the three dimensional mold object 10 and it is possible for the three dimensional mold object 10 to have sufficiently superior productivity since melting at a relatively low temperature is possible.

In a case where the water soluble resin 112 includes polycaprolactam diol, the weight average molecular weight of the polycaprolactam diol is preferably 10000 or more and 1700000 or less and is preferably 30000 or more and 1500000 or less. Due to this, it is possible to more effectively exhibit the function described above.

It is preferable that the water soluble resin 112 in the composition 11 be in a liquid phase state (for example, a dissolved state, a melted state, or the like) in at least the layer forming process. Due to this, it is possible for the uniformity of the thickness of the layers 1 which are formed using the composition 11 to be higher in an easy and reliable manner.

Solvent

The composition 11 may include a volatile solvent in addition to the components described above. Due to this, it is possible to particularly superior fluidity of the composition 11 and for the three dimensional mold object 10 to have particularly superior productivity.

It is preferable that the water soluble resin 112 be dissolved in the solvent. Due to this, it is possible for the composition 11 to have favorable fluidity and it is possible more effectively prevent unintentional variation in the thickness of the layers 1 which are formed using the composition 11. In addition, it is possible for the water soluble resin 112 to be attached to the particles 111 with higher uniformity over the entirety of the layer 1 when the layer 1 is formed in a state where the solvent is removed and it is possible to more effectively prevent unintentional unevenness in the composition being generated. For this reason, it is possible to more effectively prevent unintentional variation in mechanical strength being generated at each portion of the three dimensional mold object 10 which is obtained as a result and it is possible for the three dimensional mold object 10 to have higher reliability.

As the solvent which configures the composition 11, there are the examples of, for example, water, alcoholic solvents such as methanol, ethanol, and isopropanol, ketone solvents such as methyl ethyl ketone and acetone, glycol ether solvents such as ethylene glycol monoethyl ether and ethylene glycol monobutyl ether, glycol ether acetate solvents such as propylene glycol 1-monomethyl ether 2-acetate and propylene glycol 1-monomethyl ether 2-acetate, polyethylene glycol, polypropylene glycol, and the like, and it is possible to use one type or a combination of two or more types which are selected from these.

Among these, it is preferable that the composition 11 includes water. Due to this, it is possible for the water soluble resin 112 to be more reliably dissolved and it is possible to have particularly superior fluidity of the composition 11 and uniformity of the composition in the layers 1 which are formed using the composition 11. In addition, removing of water after forming the layer 1 is easy and it is difficult for there to be adverse effects even in a case where water remains in the three dimensional mold object 10. In addition, it is effective from the points of view of safety for people, environmental issues, and the like.

The content ratio of the solvent in the composition 11 in a case where the composition 11 includes the solvent is preferably 5% or more by mass and 75% or less by mass and more preferably 35% or more by mass and 70% or less by mass. Due to this, since the effects from including the solvent as described above are more remarkably exhibited and it is possible for the solvent to be easily removed in a short period of time in the process of manufacturing the three dimensional mold object 10, it is effective from the point of view of improving productivity of the three dimensional mold object 10.

In particular, the content ratio of water in the composition 11 in a case where the composition 11 includes water as the solvent is preferably 20% or more by mass and 73% or less by mass and more preferably 50% or more by mass and 70% or less by mass. Due to this, the effects as described above are more remarkably exhibited.

Other Compounds

In addition, the composition 11 may include compounds other than the compounds described above. As the other compounds, there are the examples of, for example, a polymerization initiator, a polymerization accelerator, a penetration enhancing agent, a wetting agent (a moisturizing agent), a fixing agent, an antimold agent, a preserving agent, an antioxidizing agent, an ultraviolet absorbing agent, a chelating agent, a pH adjusting agent, and the like.

Three Dimensional Mold Object

It is possible for the three dimensional mold object of the present embodiment to be manufactured using the method of manufacturing and the three dimensional mold object manufacturing apparatus described above. Due to this, it is possible to provide the three dimensional mold object with superior dimensional precision where defects are effectively prevented from being generated.

The applications of the three dimensional mold object of the present embodiment are not particularly limited, but there are the examples of, for example, ornaments or exhibits such as figurines, medical devices such as implants, and the like.

In addition, the three dimensional mold object of the present embodiment may be applied to any of prototypes, mass production, or made-to-order products.

The embodiments of the present embodiment are described above, but the present embodiment is not limited to this.

For example, a roller or the like may be used as the planarizing unit instead of the squeegee as described above.

In addition, the three dimensional mold object manufacturing apparatus may be provided with a recovery mechanism which is not shown in the diagrams for recovering the composition which is not used in forming the layers out of the composition which is supplied from the composition supplying section. Due to this, since it is possible to supply the composition in a sufficient amount while preventing surplus composition accumulating in the layer forming section, it is possible to more stably manufacture the three dimensional mold object while more effectively preventing defects being generated in the layers. In addition, since it is possible to use the composition which is recovered again in manufacturing the three dimensional mold object, it is possible to contribute to a reduction in manufacturing costs of the three dimensional mold object and, in addition, it is preferable from the point of view of saving resources.

In addition, the three dimensional mold object manufacturing apparatus of the present embodiment may be provided with a recovery mechanism for recovering the composition which is removed in the unbonded particles removing process.

In addition, it is described in the configuration which is shown in FIG. 3 to FIG. 6 that the light emitting section which configures the bulge detecting unit emits light for detecting the bulges in the Y axis direction, but the direction for emitting light for detecting the bulge is not particularly limited and may be, for example, the X axis direction. In addition, there may be a configuration where, for example, light for detecting the bulges is emitted in each of the X axis direction and the Y axis direction. Due to this, it is possible to easily and reliably determine the accurate coordinates of the bulges.

In addition, the bulge detecting unit in the present embodiment may be any means as long as there is a function for detecting the height of the bulge and need not be the means which is described in the embodiment described above. In particular, the bulge detecting unit in the embodiment described above is described as a representative in a case where the bulges are detected using a noncontact method (in particular, an optical method), but the bulge detecting unit in the present embodiment may be any means as long as it is possible to detect the bulges.

In addition, it is described that the bonded sections are formed with regard to all of the layers in the embodiments described above, but there may be layers where the bonded section is not formed. For example, the layer which is formed directly on the stage so that the bonded section is not formed may function as a sacrificial layer.

In addition, the binding liquid applying process in the embodiments described above is described centered on a case of being performed using an ink jet system, but the binding liquid applying process may be performed using another method (for example, another printing method).

In addition, in the manufacturing method of the present embodiment, it is sufficient if the scanning process is performed on at least a portion of the layers out of the plurality of layers which configure the three dimensional mold object and the scanning process need not be performed with regard to all of the layers.

In addition, it is described in the embodiment described above that, in addition to the layer forming process and the binding liquid applying process, the curing process is also repeatedly performed in combination with the layer forming process and the binding liquid applying process, but the curing process need not be repeatedly performed. For example, the curing process may be performed all together after the layered body, which is provided with a plurality of layers which are not cured, is formed.

In addition, it is described in the embodiment described above that the scanning process is performed with regard to the layer after the binding liquid applying process and the bonding process are performed, but the scanning process may be performed at any timing as long as it is after the first layer forming process and before the second layer forming process.

In addition, a pre-processing process, an intermediate processing process, and a post-processing process may be performed in the manufacturing method of the present embodiment according to requirements.

As the pre-processing process, there are the examples of, for example, a stage cleaning process or the like.

As the intermediate processing process, there may be a process where, for example, heating is stopped or the like (a water soluble resin solidifying process) between the layer forming process and the binding liquid applying process in a case where the three dimensional molding composition is in pellet form. Due to this, the water soluble resin is in a solid state and it is possible for the layers to obtain a stronger force for bonding the particles together. In addition, there may be a solvent component removing process where, for example, in a case where the three dimensional molding composition includes a solvent component (dispersing agent) such as water, the solvent component is removed between the layer forming process and the binding liquid applying process. Due to this, it is possible to more smoothly perform the layer forming process and it is possible to more effectively prevent unintentional variation in the thickness of the layers which are formed. As a result, it is possible for the three dimensional mold object with higher dimensional precision to be manufactured with higher productivity.

As the post-processing process, there are the examples of, for example, a washing process, a shape adjusting process where trimming is performed, a coloring process, a cover layer forming process, a bonding agent curing completion process where light irradiation processing or heat processing is performed in order to reliably cure the bonding agent which is not cured, and the like.

In addition, there is description of the embodiments described above centered on the method which has the binding liquid applying process and the curing process (the bonding process), but it is not necessary to provide the curing process (the bonding process) after the binding liquid applying process in a case where the binding liquid includes a thermoplastic resin as the bonding agent (and it is possible for the binding liquid applying process to be carried out together with the bonding process). In addition, the three dimensional mold object manufacturing apparatus need not be provided with the energy ray irradiating unit (the curing unit) in this case.

In addition, it is described in the embodiments described above that scanning is performed in order to perform detecting of the bulges on the whole outer surface of the layer, but the scanning may be performed with regard to only a region which is a portion of the layer. For example, in a case where the bulge is in a region, which is outside of a region (molding area) where a solid section is formed in the layer, and which is a region where there is a possibility that there is the bulge and the bulge will move due to planarizing using the planarizing unit, scanning for performing detecting of the bulges need not be performed for this region in a case where there is no possibility that the bulge will move in the molding area. In addition, in a case where scanning is performed for performing detecting of the bulges for this region (in the same manner as for other regions) and the bulge with a height which is equal to or higher than the predetermined height is not detected in the other regions, adjusting of the thickness of the layer (the second layer) need not be performed irrespective of whether or not the bulge is detected or not in this region.

A three dimensional mold object manufacturing apparatus is adapted to manufacture a three dimensional mold object by repeatedly forming and layering layers using a composition including particles. The three dimensional mold object manufacturing apparatus includes a layer forming section and a bulge detecting unit. The layer forming section is configured and arranged to form the layers using the composition. The bulge detecting unit is configured and arranged to detect a bulge on the layers. When the bulge detecting unit detects the bulge with a height equal to or more than a predetermined height formed on one of the layers, the layer forming section is configured and arranged to adjust a thickness of a subsequent one of the layers, which is provided directly on the one of the layers where the bulge is detected.

Due to this, it is possible to provide the three dimensional mold object manufacturing apparatus where it is possible to effectively manufacture a three dimensional mold object with superior dimensional precision where defects are effectively prevented from being generated.

In the three dimensional mold object manufacturing apparatus of the aspect, the layer forming section preferably has a raising and lowering stage and a planarizing unit configured and arranged to be relatively moved with respect to the raising and lowering stage and to planarize the composition which is applied to form the layers, and the layer forming section is preferably configured and arranged to adjust the thickness of the subsequent one of the layers by adjusting a lowering amount of the raising and lowering stage.

Due to this, it is possible to more easily and suitably adjust the thickness of the layer which is provided directly on the layer where the bulge with a height, which is equal to or more than a predetermined height, is detected.

In the three dimensional mold object manufacturing apparatus of the aspect, the layer forming section is preferably configured and arranged to form the subsequent one of the layers with a standard thickness when the bulge detecting unit does not detect the bulge on the one of the layers with the height equal to or more than the predetermined height, and the layer forming section is preferably configured to form the subsequent one of the layers with a thickness where a value, which is determined based on a largest height out of heights of bulges, is added to the standard thickness when the bulge detecting unit detects one or more of the bulges with the height equal to or more than the predetermined height.

Due to this, it is possible to more effectively prevent defects from being generated in the three dimensional mold object which is manufactured and it is possible for the three dimensional mold object to have particularly superior dimensional precision.

In the three dimensional mold object manufacturing apparatus of the aspect, when the largest height out of the heights of the bulges is Y (µm), the layer forming section is preferably configured and arranged to determine the thickness of the subsequent one of the layers in a range which is 1.05 Y or more and 1.5 Y or less when the bulge detecting unit detects one or more of the bulges with the height equal to or more than the predetermined height.

Due to this, it is possible to more effectively prevent defects from being generated in the three dimensional mold object which is manufactured and it is possible for the three dimensional mold object to have further superior dimensional precision.

The three dimensional mold object manufacturing apparatus of the aspect preferably further includes a binding liquid applying unit configured and arranged to apply binding liquid for bonding the particles.

Due to this, it is possible to apply the binding liquid with a fine pattern and it is possible for the three dimensional mold object to have particularly productive manufacturing even with the three dimensional mold object which has a fine structure.

In the three dimensional mold object manufacturing apparatus of the aspect, the binding liquid applying unit is preferably configured and arranged to adjust a discharge amount of the binding liquid based on the thickness of the subsequent one of the layers where the thickness is adjusted due to detecting of the bulge.

Due to this, it is possible to apply the binding liquid in an amount which is necessarily sufficient, it is possible to reliably form a bonded section in the desired pattern, and it is possible for the three dimensional mold object to have more reliably superior dimensional precision and mechanical strength. In addition, it is possible to reliably obtain the desired color tone in a case where a coloring agent is included in the binding liquid and it is possible to reliably prevent unintentional changes in color tone and unintentional breakdown of the color balance in accompaniment with changes in the thickness of the layer.

In the three dimensional mold object manufacturing apparatus of the aspect, the composition preferably includes a volatile solvent and a water soluble resin in addition to the particles.

Due to this, the particles are bonded (temporary fixed) together in portions of the layer where the binding liquid is not applied, it is possible to effectively prevent unintentional scattering and the like of the particles, and it is possible to achieve an improvement in the safety of an operator and dimensional precision of the three dimensional mold object which is manufactured. In addition, it is possible for the composition to have particularly superior fluidity and it is possible for the three dimensional mold object to have particularly superior productivity.

The three dimensional mold object manufacturing apparatus of the aspect preferably includes an energy ray irradiating unit configured and arranged to irradiate energy rays for fusing the particles.

In an apparatus which has a configuration where the particles are fused using energy rays in the prior art, it is particularly easy for unintentional bulges to be formed and it is difficult to obtain the three dimensional mold object with superior dimensional precision where defects are effectively prevented from being generated. In addition, in an apparatus which has a configuration where the particles are fused using energy rays in the prior art, removing the bulge is considered, but productivity of the three dimensional mold object is remarkable reduced in this case. In addition, the bulges which are generated in this apparatus are often fused (sintered) due to irradiating of energy rays and it is easy for defects to be generated in the bonded section which accompanies removing the bulges since a relatively large force is necessary for removing the bulges. In contrast to this, it is possible to effectively prevent the problems described above from being generated in the aspect even in a case where forming of the bonded section is performed by fusing the particles due to irradiating of energy rays. That is, the effects of the aspect are more remarkable exhibited in a case where forming of the bonded section is performed by fusing the particles due to irradiating of energy rays.

In the three dimensional mold object manufacturing apparatus of the aspect, the energy ray irradiating unit is preferably configured and arranged to adjust output of the energy rays based on the thickness of the subsequent one of the layers where the thickness is adjusted due to detecting of the bulge.

Due to this, it is possible to irradiate the energy rays with an energy amount which is necessarily sufficient, it is possible to more reliably form the bonded section in the desired pattern, and it is possible for the three dimensional mold object to have more reliably superior dimensional precision and mechanical strength.

In the three dimensional mold object manufacturing apparatus of the aspect, the bulge detecting section preferably has a sensor configured and arranged to be relatively moved with respect to the layers.

Due to this, it is possible to appropriately adopt a line sensor which has higher resolution and it is possible to determine the height of the bulge more accurately in a case where there are bulges on the layer.

In the three dimensional mold object manufacturing apparatus of the aspect, the bulge detecting section preferably has a sensor which is arranged so as to not relatively move with respect to the layers.

Due to this, since it is possible to check the presence or absence of the bulge with a height which is equal to or higher than the predetermined height across the entire surface of the layer without moving the bulge detecting unit (a light emitting section and a light receiving section), it is possible to shorten the time which is necessary for checking and it is possible for the three dimensional mold object to have particularly superior productivity.

In the three dimensional mold object manufacturing apparatus of the aspect, it is preferable that the bulge detecting unit is preferably configured and arranged to determine the height of the bulge by determining a focal point distance from above a main surface of the one of the layers.

Due to this, since it is possible to check the presence or absence of the bulge with a height which is equal to or higher than the predetermined height across the entire surface of the layer without moving the bulge detecting unit, it is possible to shorten the time which is necessary for scanning to check for the presence or absence of the bulge with a height which is equal to or higher than the predetermined height and it is possible for the three dimensional mold object to have particularly superior productivity. In addition, it is possible to determine not only the height of the bulge but accurate coordinates of the bulge in the XY plane.

A method for manufacturing a three dimensional mold object according to another aspect includes manufacturing the three dimensional mold object using the three dimensional mold object manufacturing apparatus according to the aspect described above.

Due to this, it is possible to provide the method for manufacturing a three dimensional mold object where it is possible to effectively manufacture a three dimensional mold object with superior dimensional precision where defects are effectively prevented from being generated.

A method for manufacturing a three dimensional mold object according to another aspect includes: forming a first layer using a composition including particles; checking presence or absence of a bulge with a height equal to or higher than a predetermined height on the first layer after the forming of the first layer; and forming a second layer using the composition including the particles directly on the first layer after the checking of the presence or absence of the bulge on the first layer. The forming of the second layer including adjusting a thickness of the second layer when the bulge with the height equal to or higher than the predetermined height is detected.

Due to this, it is possible to provide the method for manufacturing a three dimensional mold object where it is possible to effectively manufacture a three dimensional mold object with superior dimensional precision where defects are effectively prevented from being generated.

A three dimensional mold object of another aspect is manufactured using the three dimensional mold object manufacturing apparatus of the aspect described above.

Due to this, it is possible to provide the three dimensional mold object with superior dimensional precision where defects are effectively prevented from being generated.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A three dimensional mold object manufacturing apparatus adapted to manufacture a three dimensional mold object by repeatedly forming and layering layers using a composition including particles, the three dimensional mold object manufacturing apparatus comprising:
   a layer forming section configured and arranged to form the layers using the composition;
   a binding liquid applying unit configured and arranged to apply binding liquid for bonding the particles;
   an infrared ray irradiating unit configured and arranged to cure the binding liquid; and
   a bulge detecting unit configured and arranged to detect a presence or absence of a bulge on the layers,
   the layer forming section and the infrared ray irradiating unit being configured and arranged to move in the same direction, and
   in response to the bulge detecting unit detecting the presence of the bulge with a height equal to or more than a predetermined height formed on one of the layers, the layer forming section being configured and arranged to adjust a thickness of a subsequent one of the layers, which is provided directly on the one of the layers where the bulge is detected, in response to the bulge detecting unit detecting the absence of the bulge with the height equal to or more than the predetermined height formed on the one of the layers, the layer forming section being configured and arranged not to adjust the thickness of the subsequent one of the layers, and configured and arranged to form the subsequent one of the layers with a thickness that is equal to that of the one of the layers.

2. The three dimensional mold object manufacturing apparatus according to claim 1, wherein
the layer forming section has a raising and lowering stage and a planarizing unit configured and arranged to be relatively moved with respect to the raising and lowering stage and to planarize the composition which is applied to form the layers, and
the layer forming section is configured and arranged to adjust the thickness of the subsequent one of the layers by adjusting a lowering amount of the raising and lowering stage.

3. The three dimensional mold object manufacturing apparatus according to claim 1, wherein
the layer forming section is configured to form the subsequent one of the layers with a thickness where a value, which is determined based on a largest height out of heights of bulges, is added to the standard thickness when the bulge detecting unit detects one or more of the bulges with the height equal to or more than the predetermined height.

4. The three dimensional mold object manufacturing apparatus according to claim 1, wherein
when the largest height out of the heights of the bulges is Y (μm), the layer forming section is configured and arranged to determine the thickness of the subsequent one of the layers in a range which is 1.05×Y or more and 1.5×Y or less when the bulge detecting unit detects one or more of the bulges with the height equal to or more than the predetermined height.

5. The three dimensional mold object manufacturing apparatus according to claim 1, wherein
the binding liquid applying unit is configured and arranged to adjust a discharge amount of the binding liquid based on the thickness of the subsequent one of the layers where the thickness is adjusted due to detecting of the bulge.

6. The three dimensional mold object manufacturing apparatus according to claim 1, wherein
the composition includes a volatile solvent and a water soluble resin in addition to the particles.

7. The three dimensional mold object manufacturing apparatus according to claim 1, wherein
the infrared ray irradiating unit is configured and arranged to adjust output of the infrared rays based on the thickness of the subsequent one of the layers where the thickness is adjusted due to detecting of the bulge.

8. The three dimensional mold object manufacturing apparatus according to claim 1, wherein
the bulge detecting section has a sensor configured and arranged to be relatively moved with respect to the layers.

9. The three dimensional mold object manufacturing apparatus according to claim 1, wherein
the bulge detecting section has a sensor which is arranged so as to not relatively move with respect to the layers.

10. The three dimensional mold object manufacturing apparatus according to claim 1, wherein
the bulge detecting unit is configured and arranged to determine the height of the bulge by determining a focal point distance from above a main surface of the one of the layers.

* * * * *